United States Patent [19]
McMaster et al.

[11] 3,907,132
[45] Sept. 23, 1975

[54] GLASS TEMPERING SYSTEM AND APPARATUS

[76] Inventors: Harold A. McMaster, 707 Riverside Dr., Woodville, Ohio 43469;
Norman C. Nitschke, 9102 Buck Rd., Perrysburg, Ohio 43551

[22] Filed: Jan. 21, 1974

[21] Appl. No.: 435,130

Related U.S. Application Data

[63] Continuation-in-part of Ser. No. 365,939, June 1, 1973, abandoned.

[52] U.S. Cl................ 214/18 R; 65/348; 104/89; 104/172 S; 198/183; 432/128; 432/243; 432/250
[51] Int. Cl.²............... C03B 35/02; B61B 13/12
[58] Field of Search............... 214/18, 12, 21, 1 S; 104/172 R, 172 B, 172 S; 65/348; 432/243, 244; 198/183

[56] References Cited
UNITED STATES PATENTS

| | | | |
|---|---|---|---|
| 1,773,881 | 8/1930 | Smalley | 214/18 R |
| 1,787,307 | 12/1930 | Detwiler | 432/243 X |
| 1,967,638 | 7/1934 | VonReis | 198/183 |
| 2,370,381 | 2/1945 | Vaughan | 214/18 R X |

*Primary Examiner*—Robert G. Sheridan
*Attorney, Agent, or Firm*—Reising, Ethington, Barnard, Perry and Brooks

[57] ABSTRACT

A system and apparatus made up of components of the system for treating glass sheet material and the like including a furnace for heating the material, a blasthead or quenching apparatus for cooling the material after it has been heated, and a conveyor system for sequentially moving glass sheets to be treated through a loading station, the furnace, the blasthead, and to an unloading station. The conveying system includes a friction drive conveyor for conveying a carrier for the glass sheet material through the system. The friction drive prevents mechanical damage to the parts when the carrier accidentally engages obstructions, since it permits the conveyor to override the obstructed carrier. The furnace includes an upper material treating zone and a lower gas treating and distributing zone for homogenizing gases of different temperatures to minimize exposure of the sheet being treated in the treating zone to uneven temperatures. The blasthead includes a plurality of opposed nozzles for directing cooling fluid onto the sheet as it is discharged from the furnace. The blasthead reciprocates to apply uniform cooling temperature to the sheet and is provided with unique sealing features.

39 Claims, 27 Drawing Figures

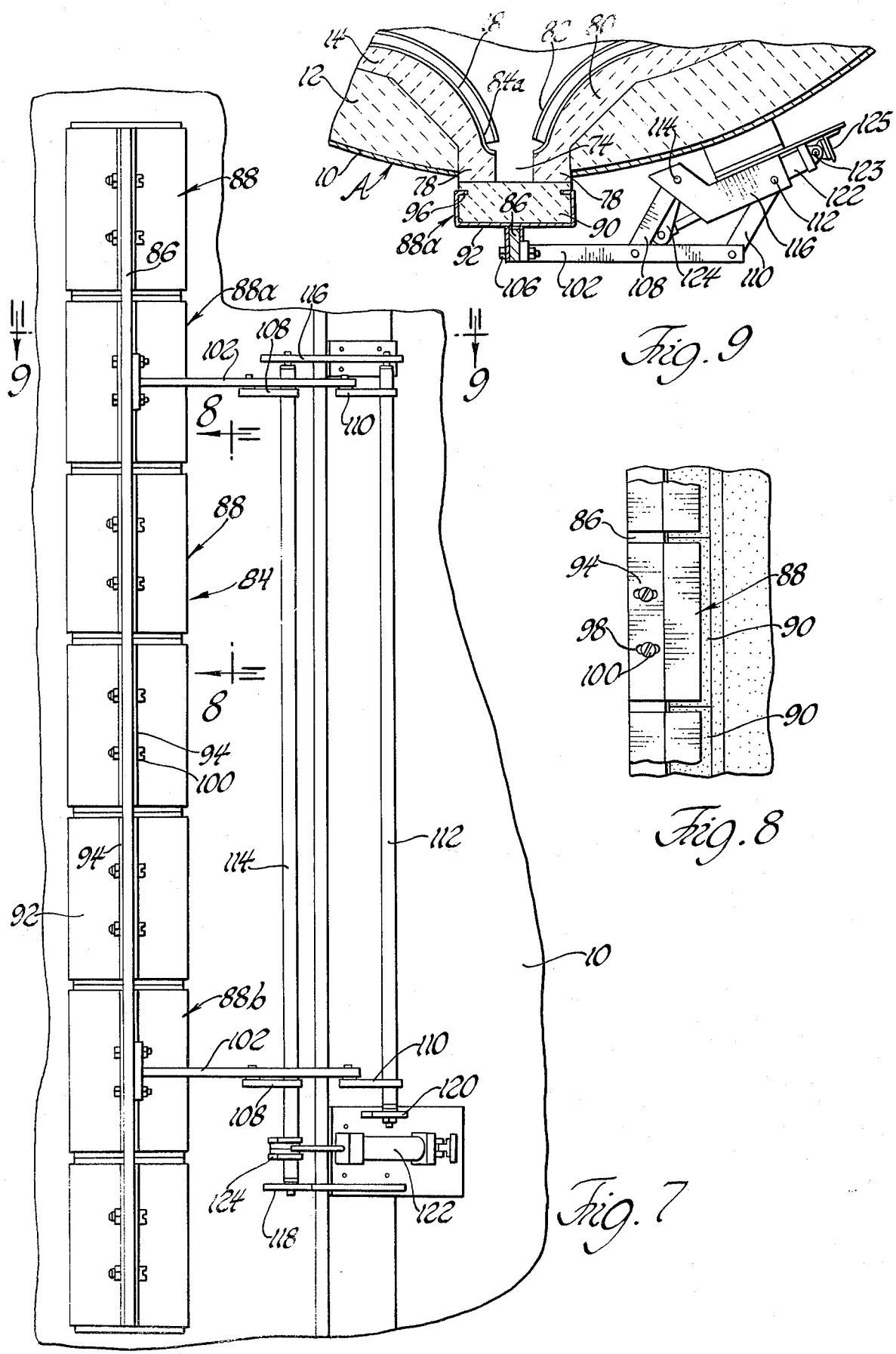

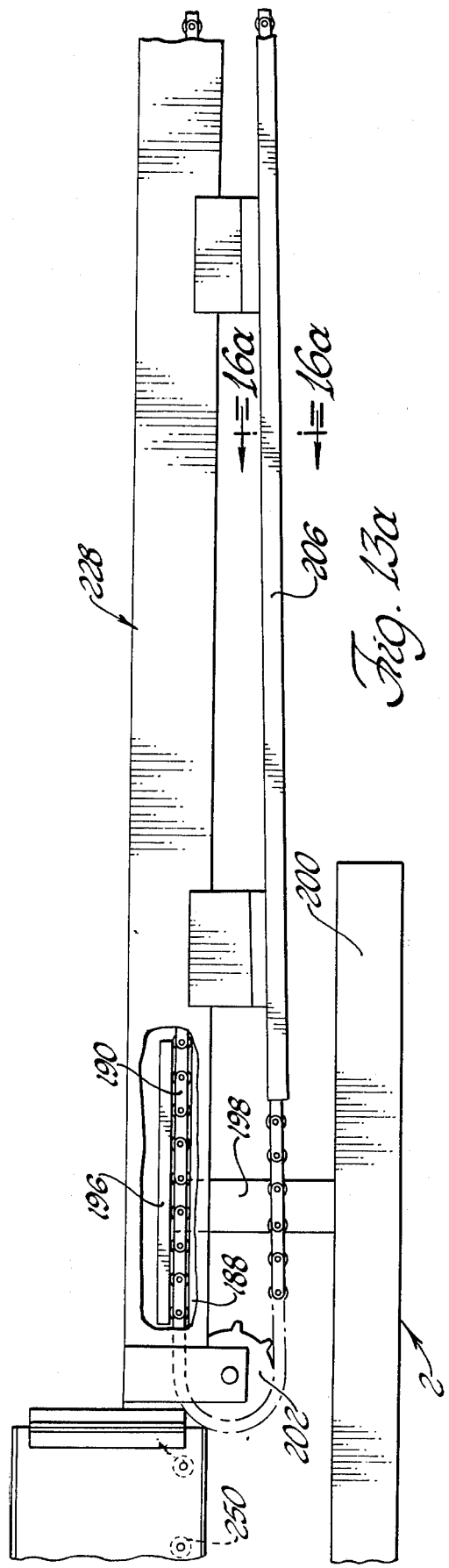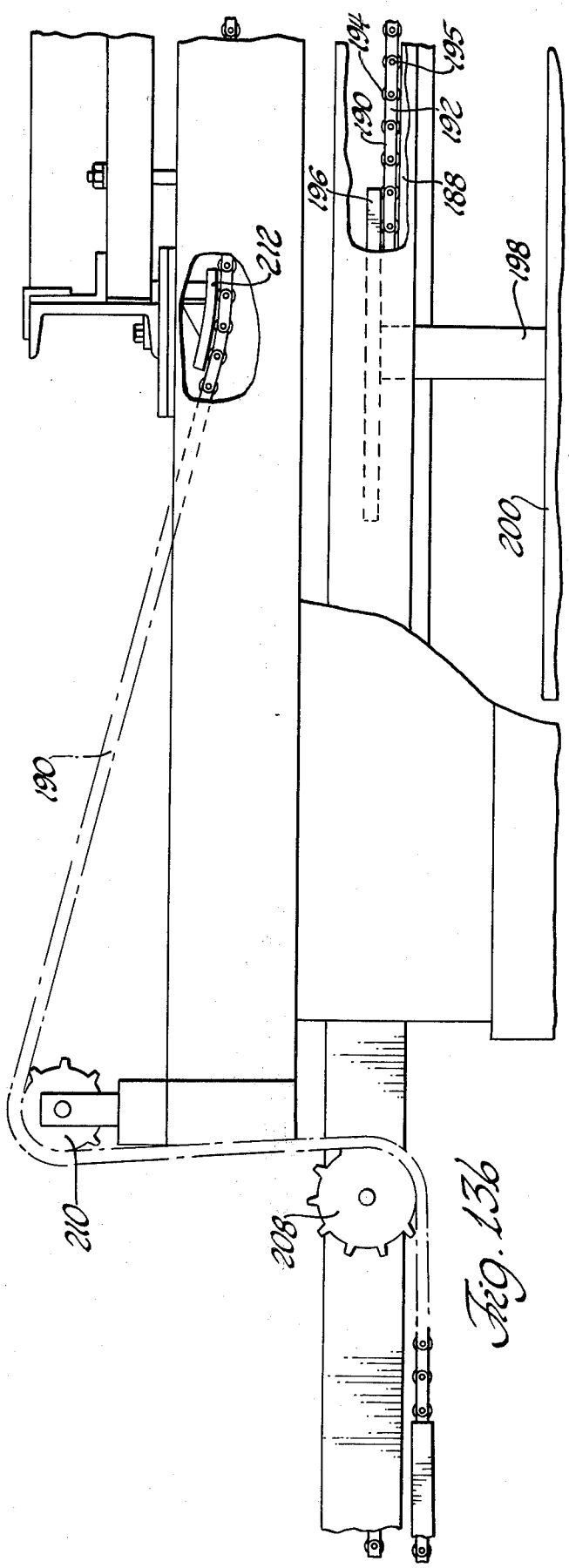

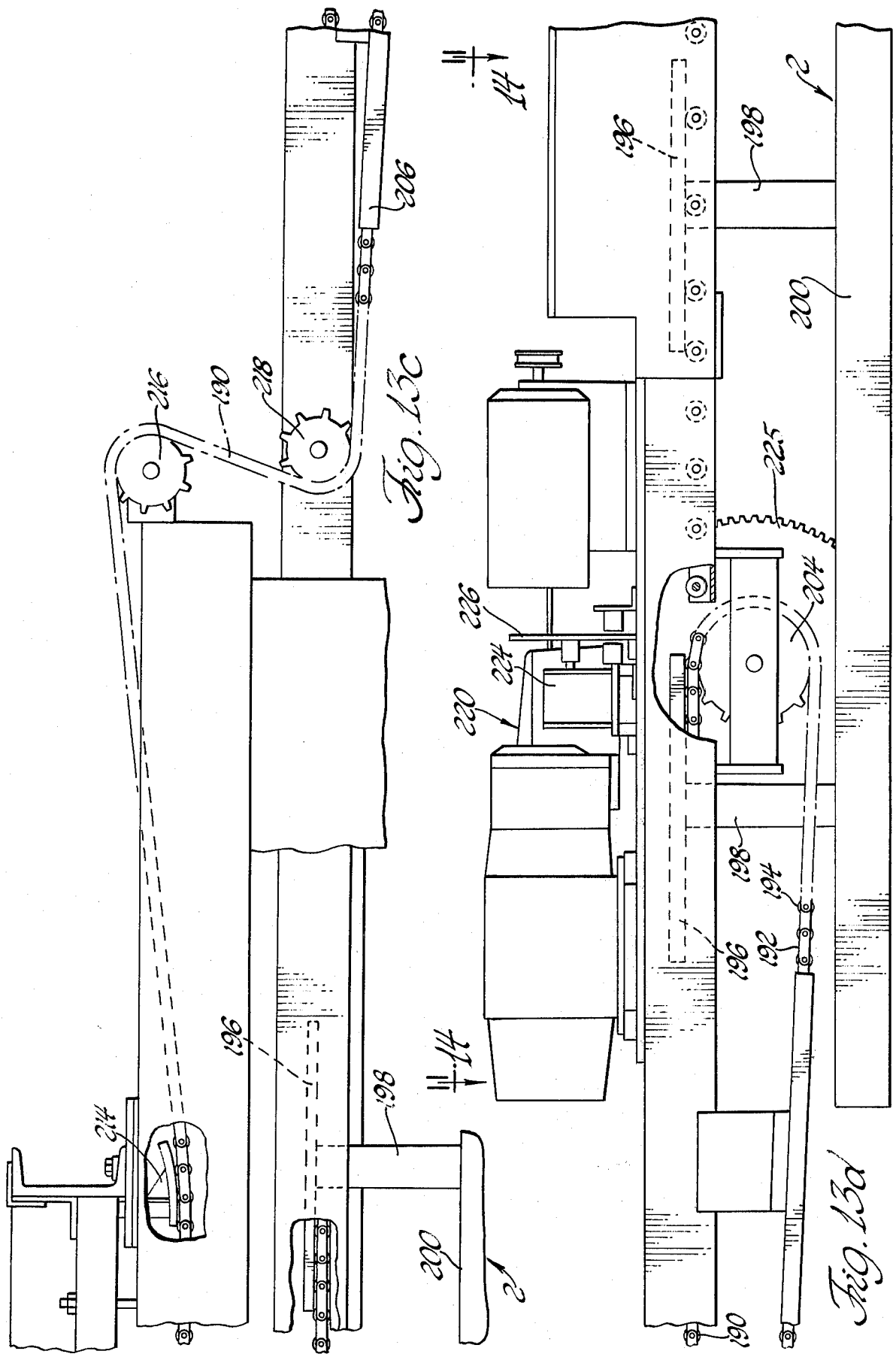

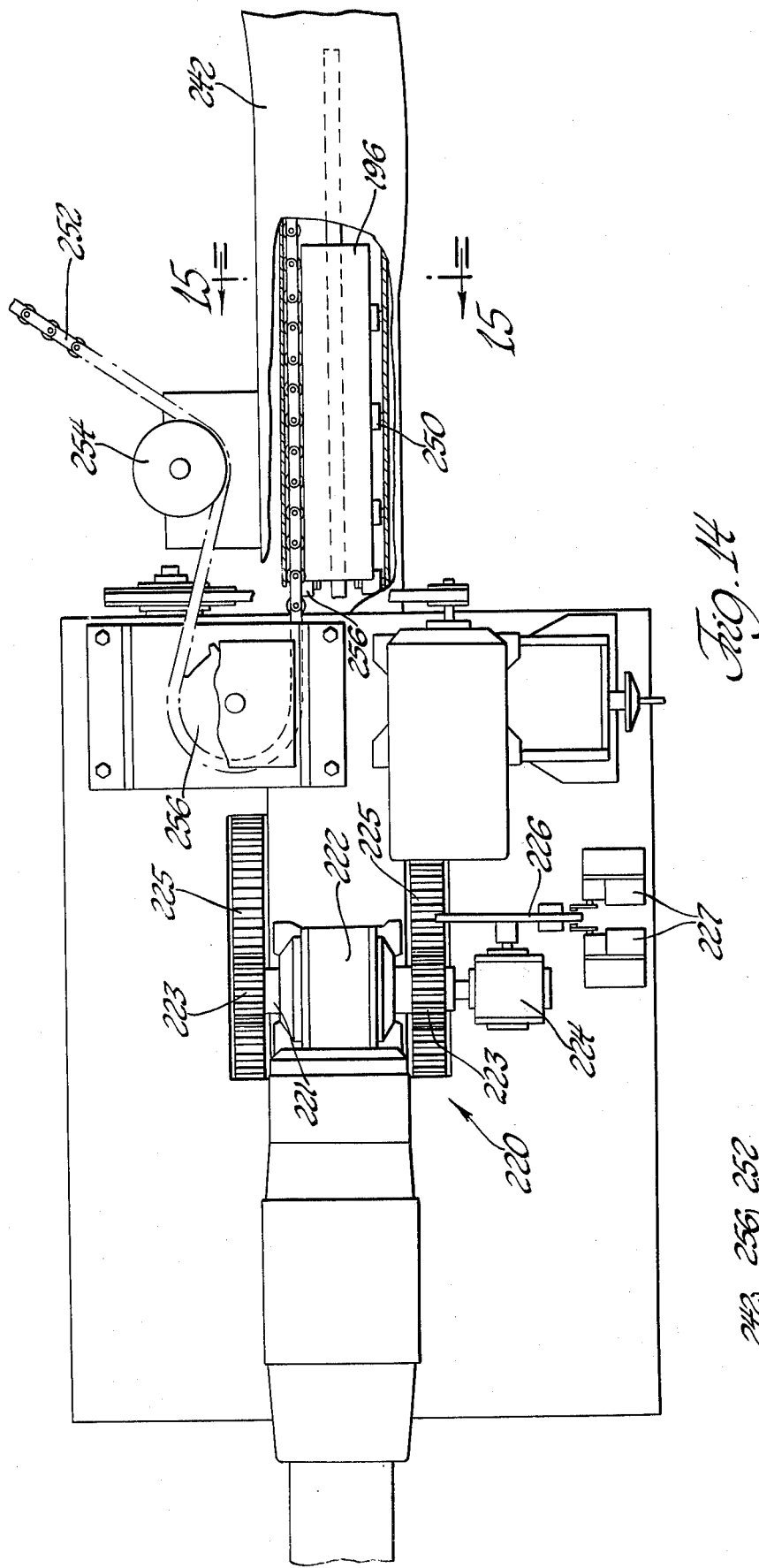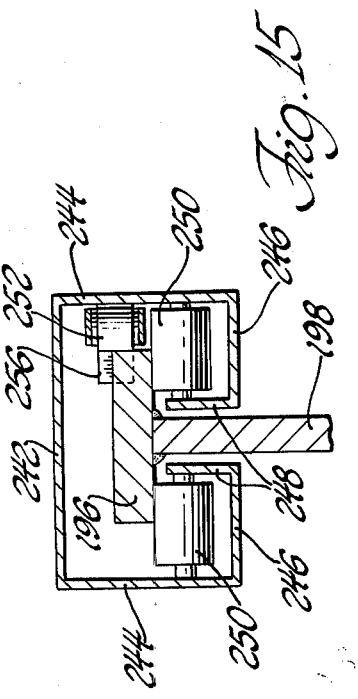

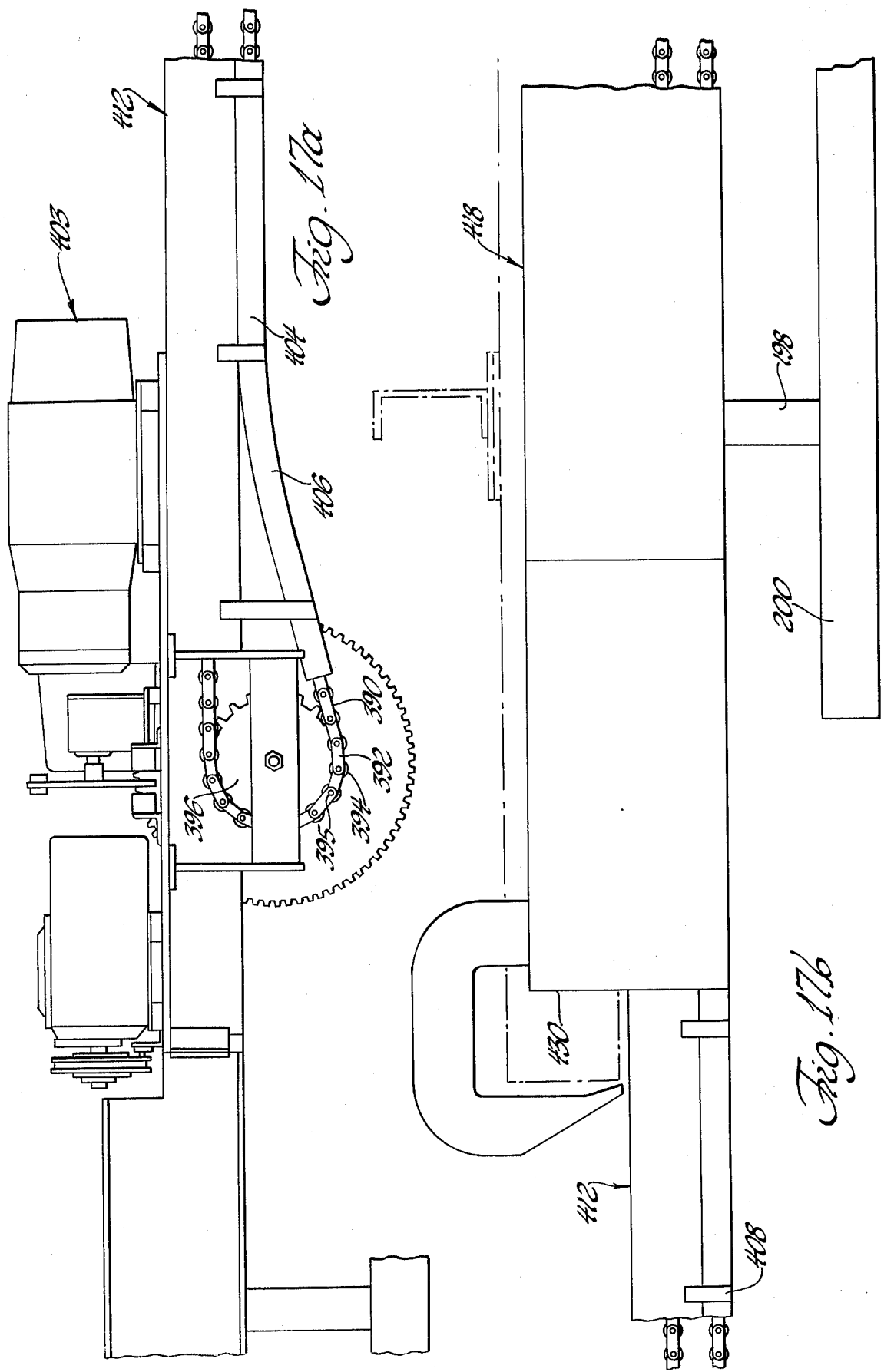

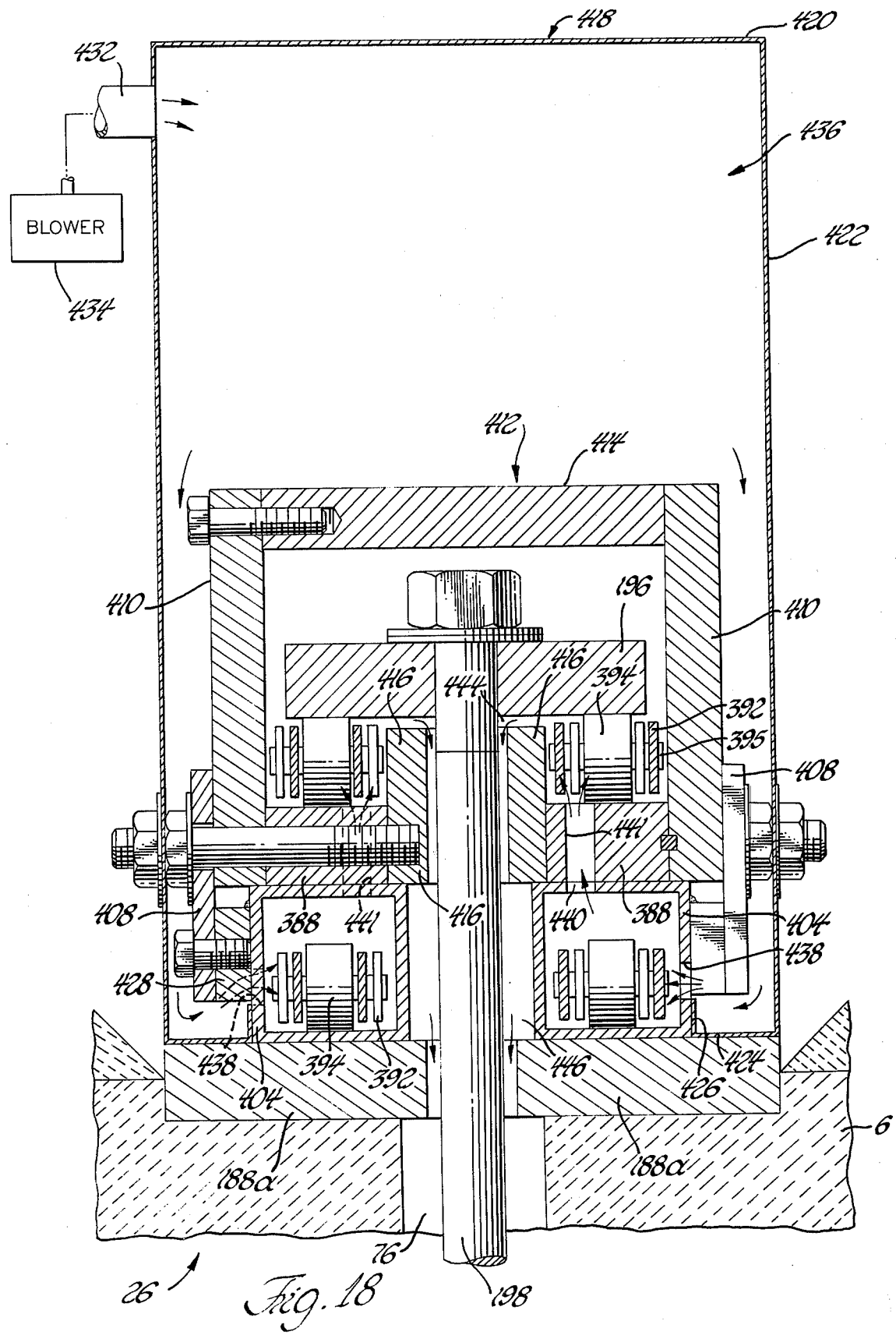

GLASS TEMPERING SYSTEM AND APPARATUS

This application is a continuation-in-part of application Serial Number 365,939, filed June 1, 1973, now abandoned.

This invention relates generally to heat treating material, and is particularly concerned with tempering glass sheet material and the like, although obviously the system and many of the components and features thereof will have applications other than in the tempering of glass.

The invention is concerned primarily with a system and apparatus for use in producing tempered glass sheets, including a conveying system, a furnace, and a blasthead or quenching apparatus, and the features and parts of the individual components of the system and apparatus.

The tempering of glass sheets by first heating the sheet and then suddenly cooling the heated sheet increases the mechanical strength of the glass sheet, which, in and of itself, increases the safety and the use of the glass. In addition, however, the safety is increased because the tempered glass, when broken, disintegrates and shatters into small, relatively dull and harmless particles instead of into large sharp slivers as is the case with untempered glass.

Conventional glass tempering processes include systems wherein untempered glass sheets are suspended by tongs on a carrier. The carrier with the sheets supported thereon are then conveyed into a furnace and heated to a desired temperature, after which the carrier with the heated sheet is conveyed to a blasthead or quenching apparatus to suddenly cool and reduce the temperature of the glass to complete the tempering process.

During the heating of the glass in the furnace, if different portions of the glass sheet are exposed to uneven temperatures, the resulting stresses can cause warpage or breakage of the sheet. It is also desirable during the cooling process that the glass sheet be uniformly bathed by the cooling fluid (see, for example, the aforementioned U.S. Pat. No. 2,724,215). As the sheet being treated is conveyed from one stage to the other of the process, it is of course undesirable for any of the moving parts to strike obstructions and cause breakage or mechanical damage to any of the components and parts of the system. It is of course also desirable to maintain a high rate of production with the glass tempering system.

One of the objects of the present invention is to provide a system for tempering glass, or for heat treating glass sheet material and the like, at a high rate of production.

Another object of this invention is to provide a furnace for heat treating glass sheet material and the like wherein the exposure of different parts of the material being treated to different temperatures during the heat treating is minimized.

A further object of this invention is to provide an improved blasthead or quenching apparatus for cooling glass sheet material and the like uniformly over its entire surface.

Another object of this invention is to provide a conveyor system for moving glass sheets to be treated through the various stages of the treatment zone including the furnace and blasthead wherein the likelihood of mechanical damage to any of the parts or components of the system brought about by malfunctions in the system causing interference between parts is minimized.

A still further object of the invention is to provide a furnace for heat treating glass sheet material and the like having one or more doors at openings through which the material enters and leaves the furnace, which doors are constructed to cooperate with the surfaces of the furnace surrounding the openings in such a manner as to minimize heat losses.

In carrying out the foregoing, and other objects, a system according to the present invention has a treatment zone including a glass tempering furnace and a glass tempering blasthead or quenching device. A loading station is defined on one side of the treatment zone and an unloading station is defined on the other side of the treatment zone. The glass sheet material and the like to be treated is supported on a carrier, and conveying means is provided for moving the carrier through the system. The conveying means includes a drive conveyor extending from the loading station through the treatment zone to the unloading station for frictionally driving the carrier through the treatment zone, and a return conveyor for returning the carrier to the loading station from the unloading station in a path that bypasses the treatment zone.

A furnace according to the present invention may include an enclosure having top, bottom and side walls of fire brick, ceramic material or other refractory material with a transverse partition spaced between the top and bottom walls and dividing the interior of the enclosure into two zones. The upper zone is the material treating zone, and the lower zone is primarily a gas mixing and heating zone. Electrical heating elements or other sources of heat are mounted in both zones. Gas treating and distributing means is provided in the lower zone and is operable to (1) draw gas from the upper zone into the lower zone, (2) draw ambient air or other gas from the exterior of the furnace enclosure into the lower zone, (3) mix the exterior gas and gas from the upper zone to provide a mixture having a substantially homogeneous temperature, (4) heat the homogeneous mixture of gases and (5) force the heated, homogeneous mixture of gases into the upper zone past the heating elements in both zones at the sides of the furnace for uniformly heating the sheet material being treated and for pressurizing the upper zone. The gas is recirculated into the upper glass treatment zone in a manner to minimize turbulence and to maintain a substantially uniform temperature over the entire surface of the glass sheet. A differential temperature control is provided to control the temperature of the heating elements in the upper and lower zones in order to maintain an adequate, uniform temperature in the furnace during the treatment stage.

The furnace is further provided with a door for closing the inlet and outlet openings for the entry and exit of the material being treated which is made up of individual segments of refractory material that can be adjusted to accommodate irregularities on the surface surrounding the openings and minimize the loss of pressurized heated air from the upper zone.

A tempering blasthead according to the present invention includes a pair of spaced plenum chambers carried by a yoke member which is supported on a roller mounted eccentrically on a shaft. Rotation of the shaft thereby imparts vertical reciprocating motion to the yoke and plenum chambers. Each of the plenum chambers has a bank of nozzles extending inwardly into the space between the plenum chambers, the nozzles being inclined downwardly so that when a sheet of glass is removed from the furnace and disposed in the space between the opposed banks of nozzles, the heated sheet of glass is bathed uniformly over its surface by the reciprocating motion of the plenum chambers, and the downward inclination of the nozzles directs the air downwardly to center the glass sheet between the two sets of nozzles. The plenum chambers are supplied from overhead blowers and a novel seal arrangement is provided at the connection between the reciprocating plenum chambers and the fixed blower outlets. A damper is provided to regulate the pressure from the blowers so that the pressure in the plenum chambers is equalized. The blasthead, in addition to being supported on the eccentric roller, is suspended by tension springs to provide a smooth reciprocating motion of the blasthead.

The conveying means for the system includes a drive conveyor extending from the loading station through the furnace and blasthead to the unloading station. The drive conveyor includes rails and a chain including a series of rollers connected by links, the rollers having diameters such that the peripheries extend beyond the peripheries of the links. The active run of the chain has its rollers supported on the rails, and the carrier for the material to be treated has a slide member supported on the upper peripheries of the rollers so that movement of the chain causes the carrier to move by the frictional engagement with the rollers. Cooling means is provided for the portion of the drive conveyor extending across the slotted top of the furnace to maintain the lubricant for the roller axles at an acceptably low temperature. Air curtains impinge on the tops of the doors. In order to maintain sufficient frictional engagement between the slide members of the carrier and the rollers, the non-active portion of the chain on its return movement to the rails passes through channels having powdered friction material received therein, and the powdered friction material contacts and adheres to the periphery of each roller to maintain an adequate coefficient of friction between the rollers and the slide members of the carriers. The frictional drive arrangement prevents mechanical damage to the parts and components of the system such as would occur, for example, should one of the carriers engage the door of the furnace before it opens. The frictional drive arrangement would, in that case, permit the drive conveyor to override the carrier without damage to parts.

The present invention is thus not only embodied in the overall system for treating glass sheet material and the like, but is embodied in the individual components including the heat treating furnace and the novel parts and features thereof, the blasthead and its novel features and parts, and the conveyor system with its novel features and parts.

Other objects, advantages and features of the invention will become apparent from the following description taken in connection with the accompanying drawings in which:

FIG. 7 is an elevational view of one of the furnace doors as viewed on lines 7—7 of FIG. 1;

FIG. 8 is a detailed view of one segment of the furnace door as viewed on lines 8—8 of FIG. 7;

FIG. 9 is a sectional view taken along lines 9—9 of FIG. 7;

FIG. 10b is an elevational view of the blower portion of the blasthead of FIG. 10a;

FIG. 10c is an enlarged detail view of the blasthead rolling seal taken at the area enclosed by circle 10c in FIG. 10a;

FIG. 11 is a view taken along lines 11—11 of FIG. 10a;

Figure 1:
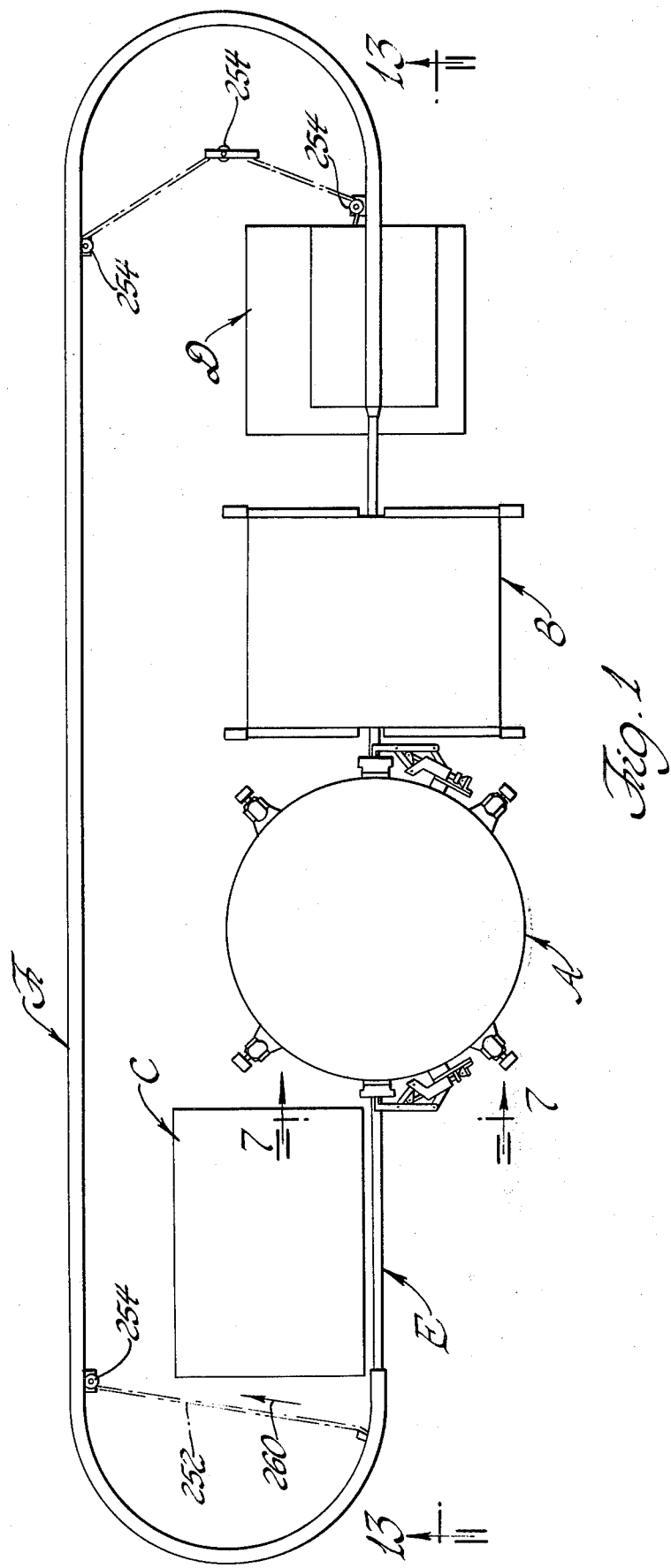
FIG. 1 is a plan view of an entire system for treating glass sheet material and the like embodying the invention.
Figure 2:
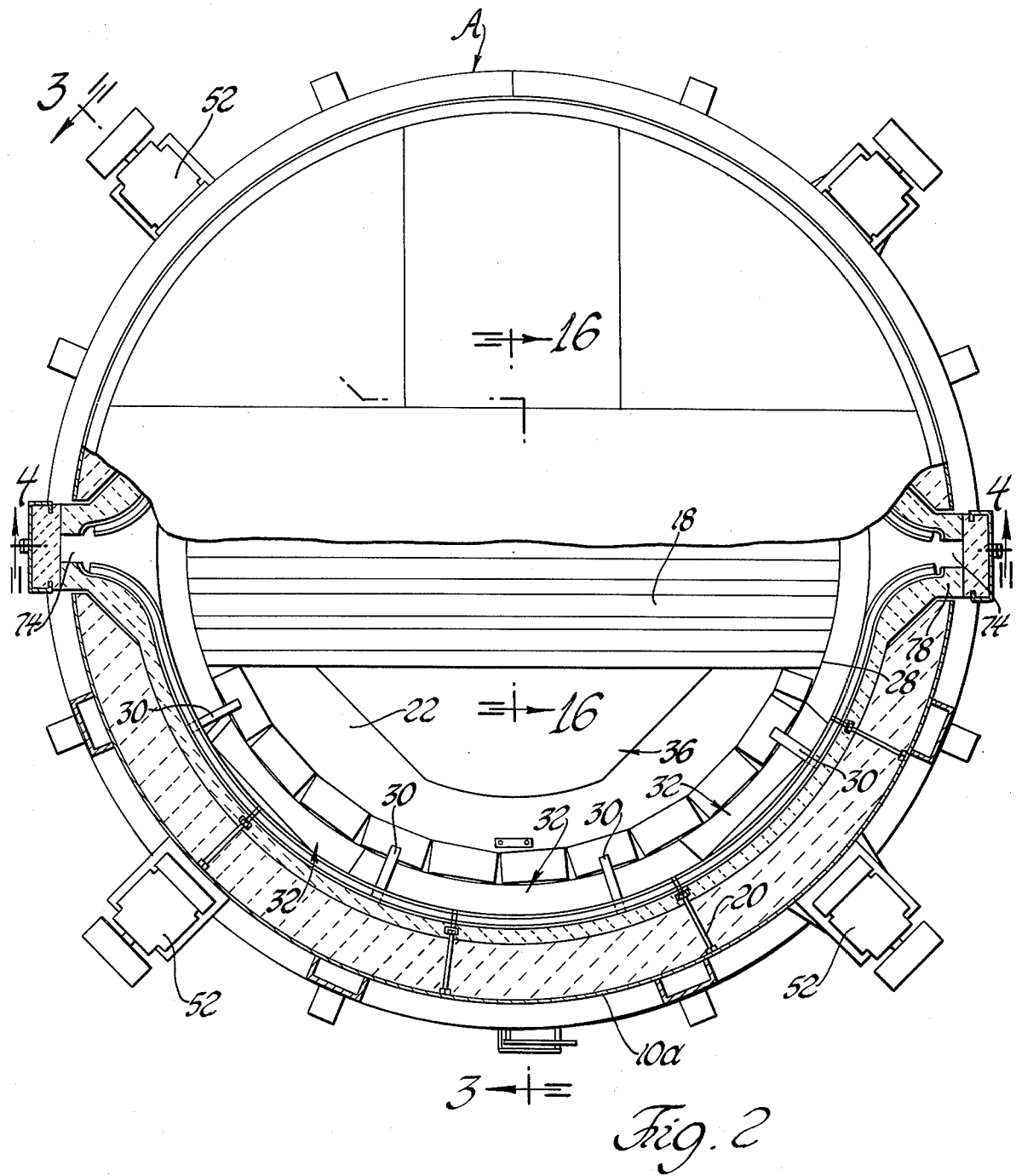
FIG. 2 is a top plan view, partially in section, of a heat treating furnace embodying the invention and of the type that may be used in the system shown in FIG. 1.
Figures 16, 16A:
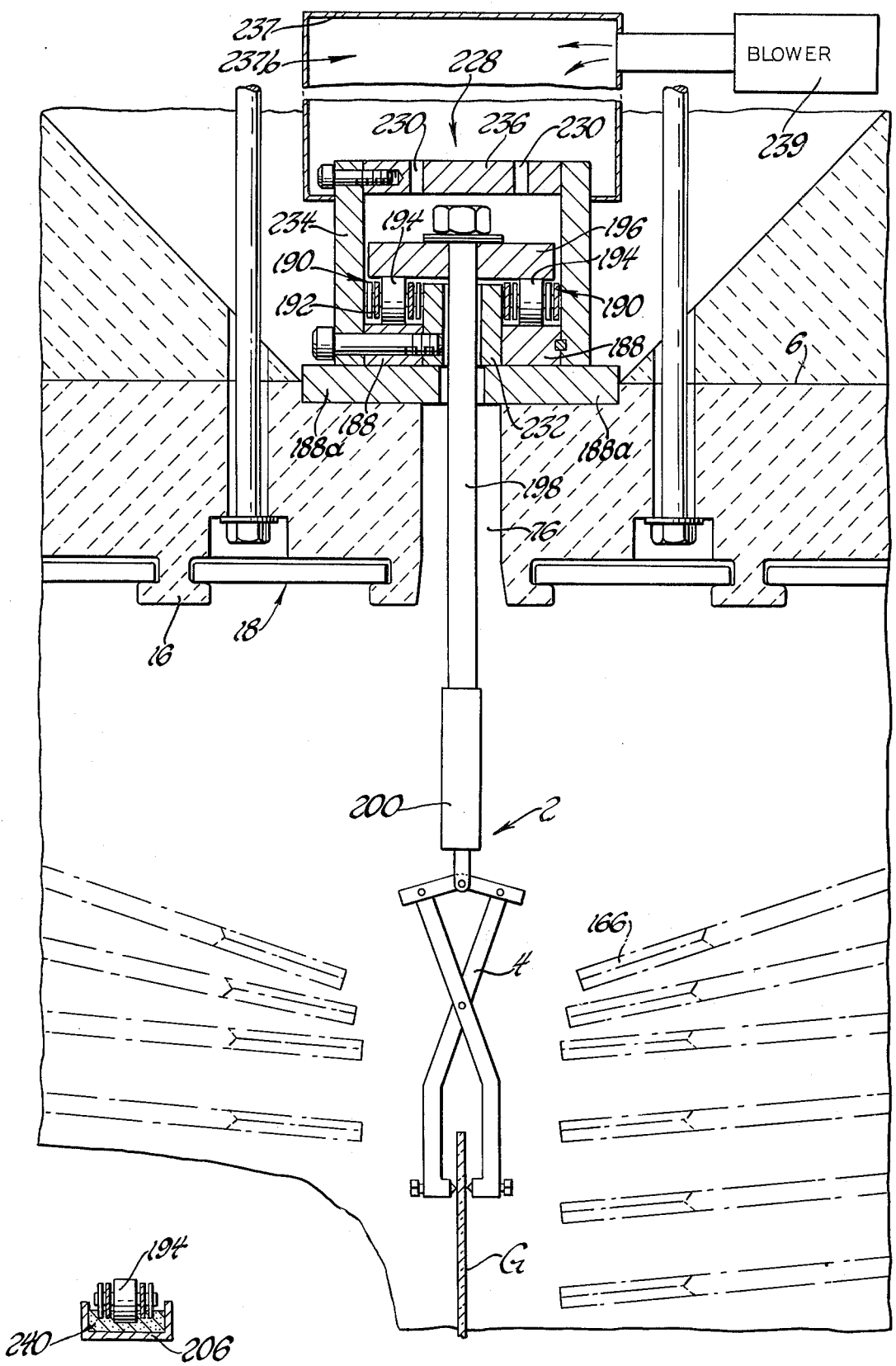
Figure 17C:
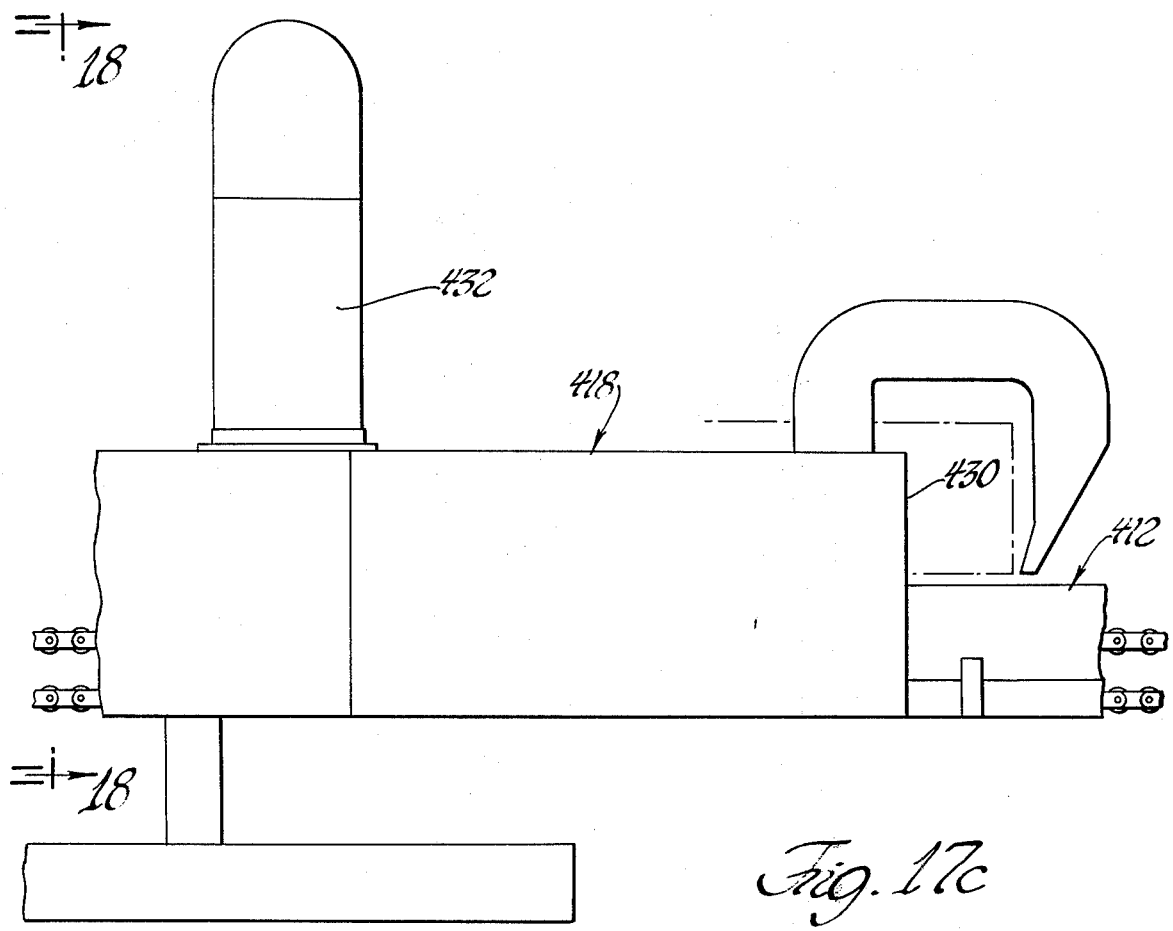

FIG. 13a, b, c and d are elevational views of sequential segments of the drive conveyor as viewed along lines 13—13 of FIG. 1;

FIG. 14 is a view taken along lines 14—14 of FIG. 13d;

FIG. 15 is a sectional view taken along lines 15—15 of FIG. 13d;

FIG. 16 is a composite sectional view illustrating the drive conveyor with a sheet of glass located within the furnace along lines 16—16 of FIG. 2, and also illustrating in phantom lines a portion of the blasthead nozzles in a different plane;

FIG. 16a is a sectional view taken on lines 16a—16a of FIG. 13a illustrating the cross-section of channel-shaped return rails for the drive conveyor chains and friction material in the return rails being applied to the peripheries of the rollers of the chain;

FIGS. 17a, b, c and d are sequential views similar to FIGS. 13a, b, c and d illustrating an alternative construction of the drive conveyor embodying the invention; and FIG. 18 is a sectional view of the furnace top similar to FIG. 16 taken approximately along lines 18—18 of FIG. 17c illustrating another form of conveyor and conveyor cooling system embodying the invention.

FIG. 1 illustrates a system including a treatment zone for glass sheet material and the like comprised of a furnace collectively designated by reference character A and a blast head collectively designated by reference character B. A loading station C is defined at one end of the treatment zone, and an unloading station D is defined at the other end of the treatment zone. Glass sheets to be tempered by the furnace A and blast head B are loaded onto a conveying system at the loading station C and are removed from the conveying system at the unloading station D after the tempering operation is completed. The conveying system includes a drive conveyor designated collectively by reference character E extending from the loading station C through the treatment zone to the unloading station D, and a return conveyor F. The glass sheets G (FIGS. 3 and 4) are suspended from carriers designated collectively by reference numeral 2 by a pluralilty of tongs 4. The tongs 4 may be of conventional construction. The glass sheets G are placed on the carriers 2 by the tongs 4 at the loading station C, and the drive conveyor E moves the carrier 2 with the glass sheet G suspended therefrom through the treatment zone to the unloading station D in a manner set forth in greater detail below. When the treated sheet of glass G is removed from the carrier 2 at the unloading station D, the return conveyor F carries the carrier 2 from the unloading station D to the loading station C for another treatment cycle.

Figure 3:
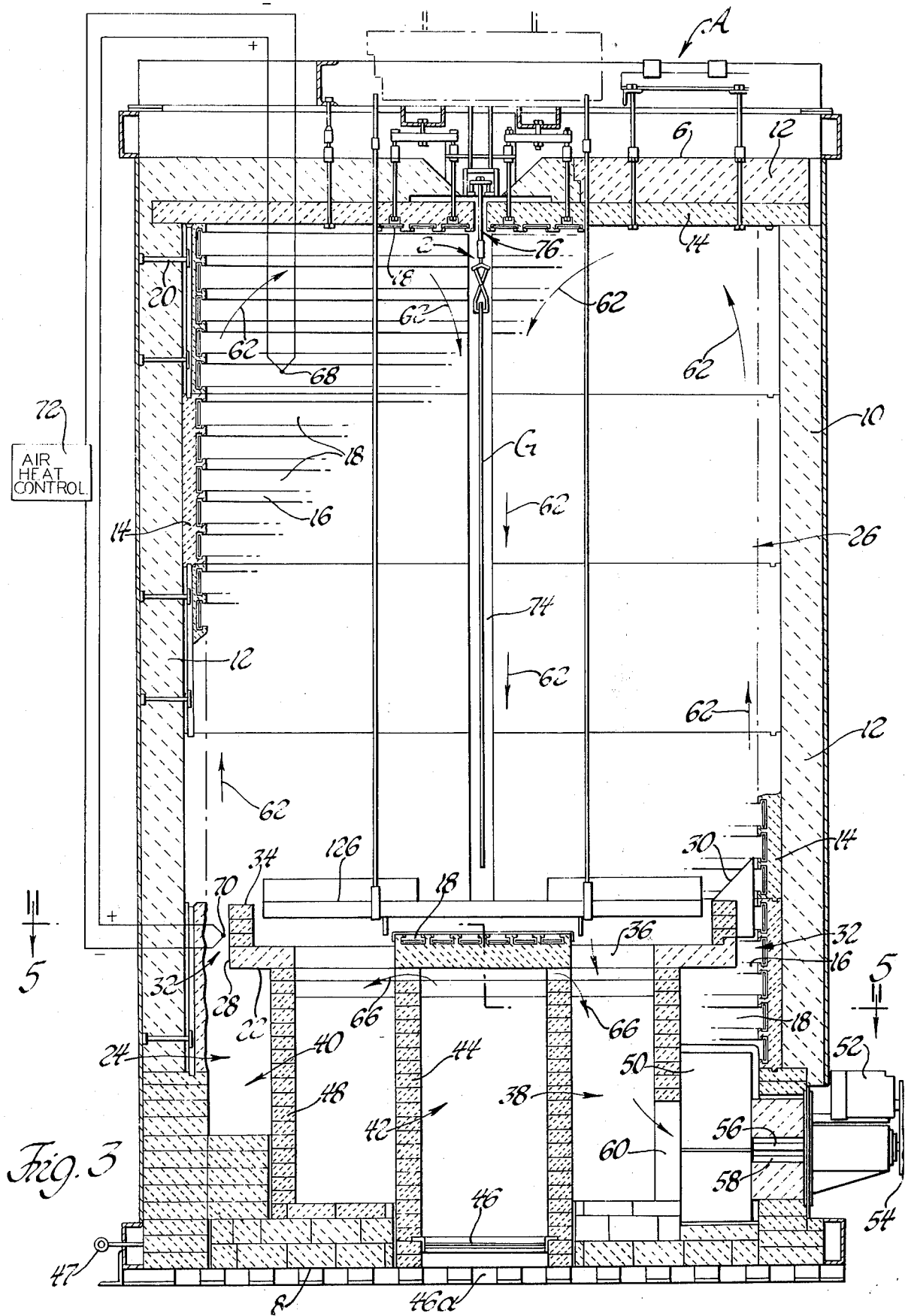
FIG. 3 is a sectional elevational view of the furnace of FIG. 2 taken on lines 3—3 of FIG. 2.
Figure 4:
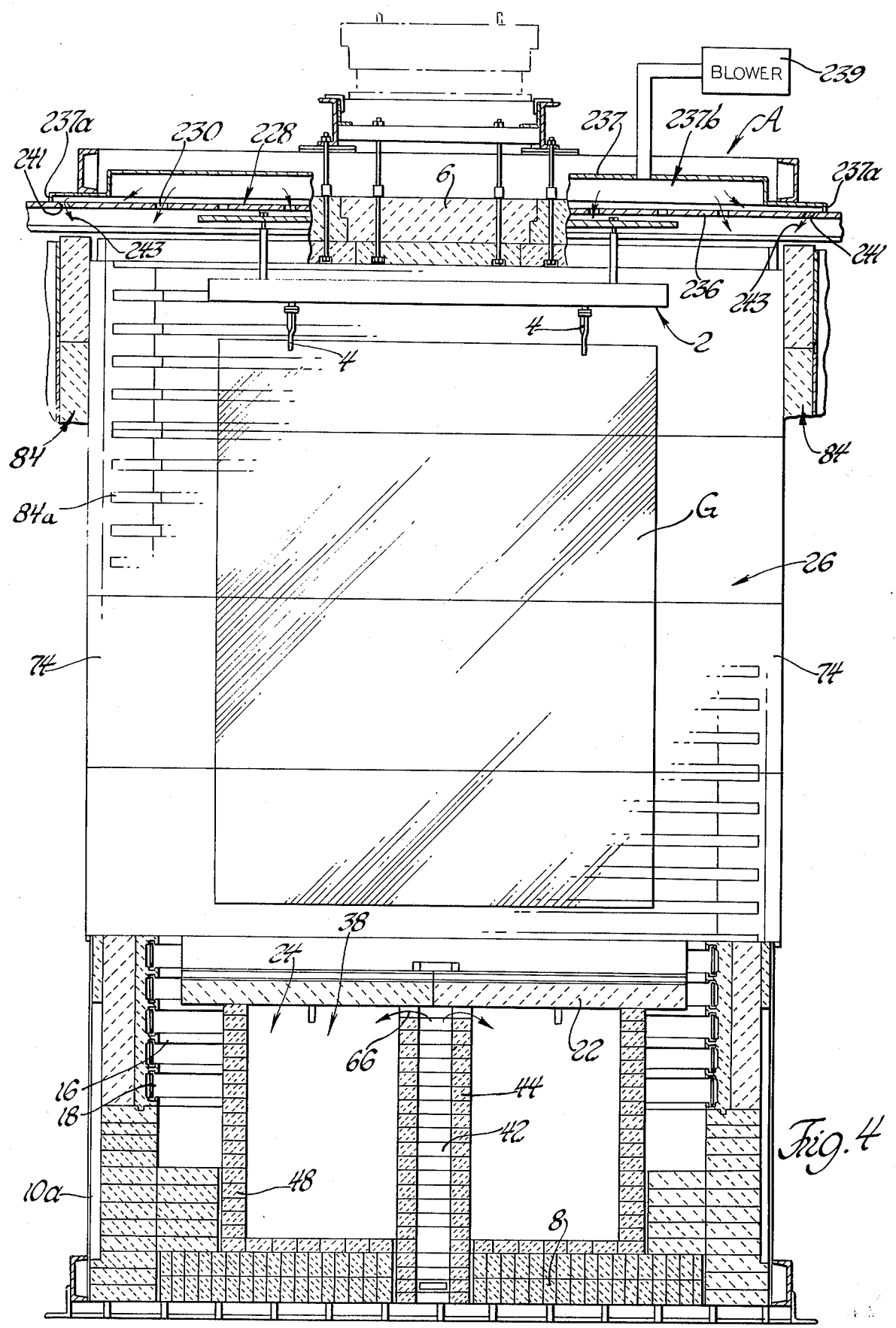
FIG. 4 is a sectional elevational view of the furnace of FIG. 2 taken on lines 4—4 of FIG. 2.

The construction of the furnace A is illustrated in detail in FIGS. 2 through 9. As shown in FIGS. 3 and 4, the furnace A comprises an enclosure having a top wall 6, a bottom wall 8, and a side wall 10. The top and side walls 6 and 10 are formed of an outer, insulating layer 12 of refractory material and an inner layer 14 of firebrick or other refractory material. The layers 12 and 14 may both be of castable material. The inner layer 14 of the side wall 10 are formed integrally with outwardly projecting T-sections 16. Adjacent pairs of the T-sections 16 form supports for electrical heating elements 18. The elements making up the layers 12 and 14 are cast with appropriate openings and recesses for receiving rod connectors 20 of conventional construction for securing the layers 12 and 14 together, and to the shell 10a.

A transverse partition 22 (FIGS. 3 and 4) is spaced between the top and bottom walls 6 and 8 and divides the interior of the enclosure into a first, or lower gas or air heating zone 24, and a second, upper glass heating zone 26. The heating elements 18 in the side wall 10 are located in both the lower and upper zones 24 and 26, respectively.

As is pointed out in greater detail below, gas or air treating and distributing means is located in the first, lower zone 24 which is operable to (1) draw relatively low temperature gas from the lower portion of the second, upper zone 26 into the lower zone 24, (2) draw ambient air or other gas from the exterior of the furnace A into the lower zone 24, (3) mix the exterior gas and the gas drawn from the upper zone 24 to provide a mixture having a substantially homogeneous temperature throughout, (4) heat the homogeneous mixture of gases, and (5) force the heated, homogeneous mixture of gases into the second, upper zone 26 along the side wall to help maintain a uniform, tempering temperature on the glass sheet G located in the upper zone 26, and to pressurize the upper zone.

The entire periphery 28 of the partition 22 is spaced from the inner side wall of the enclosure, and a plurality of vanes 30 in the form of blocks of refractory material are seated on the edge of the partition and span the gap between the peripheral edge 28 and the T-sections 16. The vanes 30 are spaced from each other to define a series of slots 32 at the periphery of the partition 22. The vanes 30, as shown in FIG. 3, have a lip which seats on the upper edge of an upstanding wall 34 formed by firebrick or other refractory material around the periphery of the partition 22, except at the central portion thereof in which are mounted additional horizontal heating elements 18 (FIGS. 2 and 3).

Spaced inwardly from the periphery of the partition 22 are openings 36 for providing a passage for the gases from the lower portion of the zone 26 into the lower zone 24.

Defined in the lower zone 24 is an intake chamber 38 and a discharge chamber 40. The openings 36 communicate with the intake chamber 38, and the slots 32 communicate with the discharge chamber 40.

A chimney 42 extends between the bottom wall 8 and the transverse partition 22. The chimney 42, in the illustrated embodiment, is enclosed by a rectangular wall 44 which also defines the inner walls of the intake chamber 38. The lower end of the chimney communicates with ambient atmosphere, and an adjustable damper 46 is mounted in the chimney near the lower end thereof. The damper is adjusted by a handle 47 (FIG. 5) mounted on the end of a rod 49 extending through the lower side wall of the furnace. A vertical wall 48 surrounds the chimney 44 and defines the outer wall of the intake chamber 38 and the inner wall of the discharge chamber 40. The outer wall of the discharge chamber 40 is defined by the side wall of the furnace enclosure.

Figure 5:
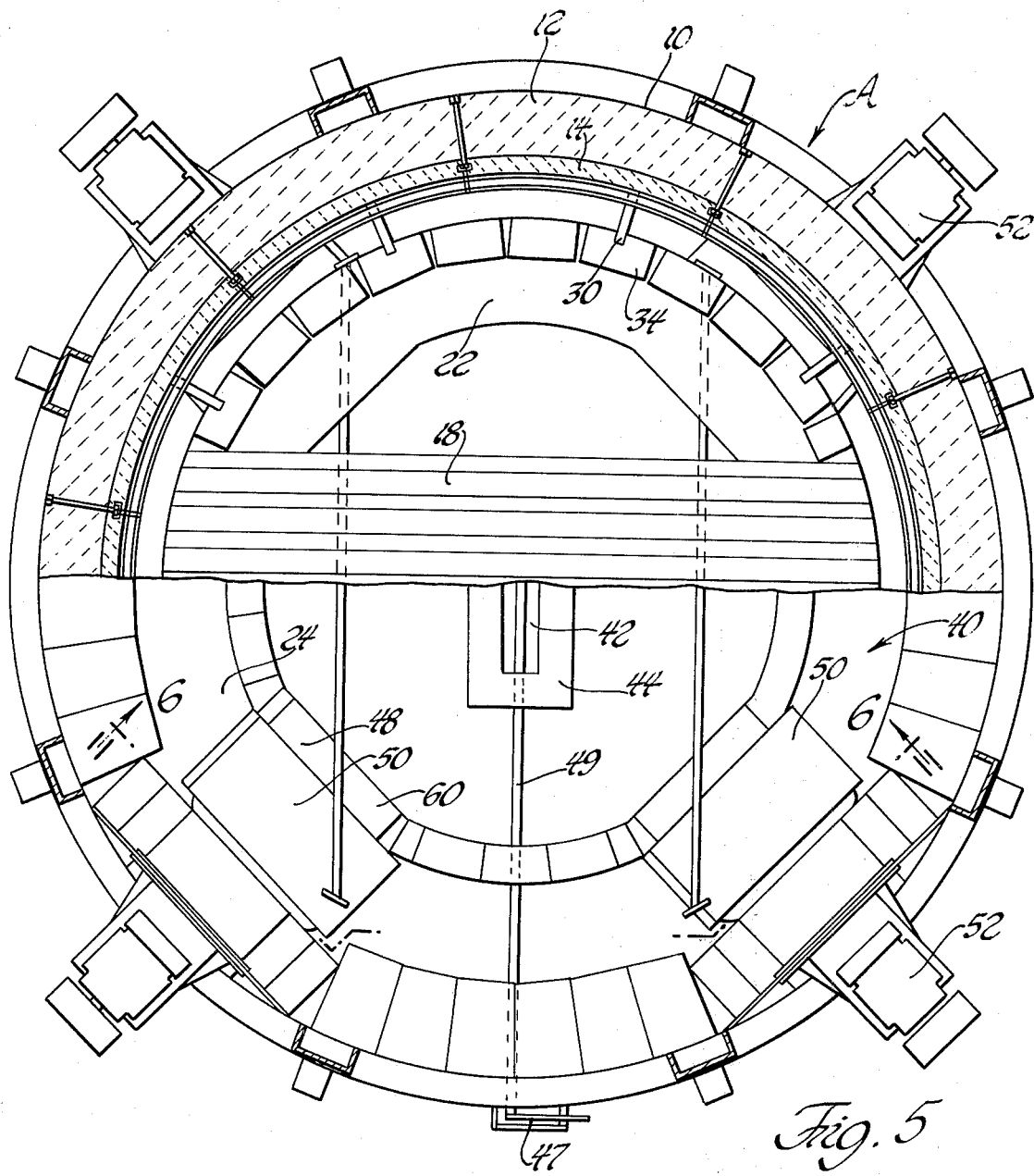
FIG. 5 is a sectional view taken approximately on lines 5—5 of FIG. 3.
Figure 6:
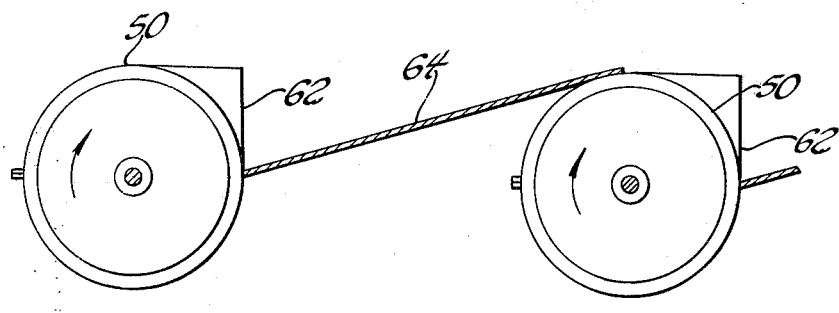
FIG. 6 is a sectional view taken approximately on lines 6—6 of FIG. 5.

A plurality of blowers 50 are mounted in the discharge chamber 24. In the illustrated embodiment, four such blowers are located within the discharge chamber 24 (FIG. 5). In the illustrated embodiment, the blowers are conventional scroll type blowers driven by motors 52 mounted externally of the furnace enclosure. In the illustrated embodiment, as shown in FIG. 3, each motor 52 drives the shaft 56 of its respective blower through gearing 54. The shaft 56 of the blower extends through an opening 58 in the side wall of the furnace enclosure. The opening 58 is of greater diameter than the shaft 56, and the shaft 56 is in unsealed relationship with the opening 58 so that operation of the blower draws ambient air through the opening 58 into the blower. The blower 50 also has its intake side connected with the intake chamber 38 through an opening 60 formed in the wall 48. Each of the blowers 50 has its discharge opening 62 directed along the length of the discharge chamber 24. As shown in FIG. 6, a ramp 64 extends from the lower end of the discharge opening 62 of one blower upwardly to the adjacent, downstream blower 50. The ramp 64 thus has its lower end disposed adjacent the discharge opening of the blower on the lower side of the discharge opening 62, and its upper end spaced from the lower end along the length of the discharge chamber and nearer to the slots 32 for deflecting the flow from the blower toward the slots into the second, upper zone 26.

As shown in FIGS. 3 and 4, a plurality of openings 66 are provided at the upper end of the chimney 42. Hence, operation of the blowers draws air through the chimney 42 and openings 66 into chamber 38 as well as from the upper zone 26 through openings 36 to the intake sides of the blowers 50. The ambient air from the chimney 42 and the openings 58 surrounding the shafts 56 of the blower is mixed with the higher temperature gases drawn through the openings 36 from the upper gas treating zone 26. The action of the blowers in the lower zone 24, together with the arrangement of the chimney, intake chamber and discharge chamber, as well as the ramp 64, thoroughly mixes and homogenizes the air or other gases in the lower zone 24 to provide a substantially uniform temperature of the gas discharged through the peripheral slots 32 past the heating elements 18. The vanes 30 deflect the gases upwardly in the direction of the arrows 62 (FIG. 3) and reduce the spiraling, turbulent motion of the gas discharged from the blowers 50.

The gases are additionally heated by the heating elements 18 in the lower zone 24 at the slots 32 so that the heated gas rises along the heating elements 18 in the side wall of the upper zone 26 toward the inner surface of the top wall 6. The gases then circulate inwardly toward the glass sheet G and then downwardly to the openings 36. The circulation is such as to provide a minimum amount of turbulence and a minimum amount of temperature differential along the surface of the glass sheet G during the time that it is disposed in the furnace A, as well as to reduce the temperature differential over the inner surfaces of the upper zone 26. Thus, the heated gases from the lower zone 24 are forced upwardly along the periphery of the glass treating zone 26 to be exposed directly to the electrical heating elements 18 located in the side wall 10, and are drawn through the intake chamber 38 by the blowers at a location spaced inwardly from the side wall 10 so that the gases move downwardly along the surfaces of the glass sheet G. As pointed out previously, the vanes 30 reduce the turbulence of the gas flowing into the upper zone 26 from the lower zone 24 and deflect the gases upwardly in a slightly spiral path.

The electrical heating elements 18 in the lower and upper zones 24 and 26 are controlled by a differential air heat controller 72. The controller 72 responds to the temperature differential between the slots 32 and the upper zone 26 as sensed by a pair of thermocouples 68 and 70. The thermocouple 68 is disposed in the upper zone 26 and the thermocouple 70 is disposed in the slot 32. If a temperature differential is sensed by the controller 72 as a result of a low temperature condition at thermocouple 70, additional energy is supplied to the heating elements 18 in the lower zone 24 to reduce or eliminate the temperature differential. The temperature of the upper zone 26 is controlled by a separate thermocouple and temperature controller (not shown).

In order to permit the glass sheet G to move through the furnace, diametrically opposed openings 74 are formed in the side wall 10. Similarly, a slot 76 extends between the openings 74 in the top wall 6 to permit the carrier 2 to pass through the furnace. With reference to FIG. 9, the inner layer 14 of silica material has end portions 78 which project beyond the insulating layer 12 and define the opening 74. The illustrated furnace A, as shown in FIGS. 2 and 5, is of substantially circular cross-section. Hence the inner layer 14 comprises two semi-circular sections in cross-section with outwardly curved and slightly thickened portions 80 terminating in the end portions 78 projecting beyond the periphery of the side wall 10. The space between the end portions 78, as pointed out previously, defines the opening 74 through which the vertically suspended glass sheet passes to enter into or exit from the furnace. Due to the low coefficient of thermal expansion of the silica material 14 held to the shell 10a by rod connectors 20, the surfaces surrounding the opening 24 maintain a constant shape at all temperatures. The T-sections 16 are also formed with outwardly curved end portions 82 conforming to the configuration of portions 80. The heating elements 18 additionally have outwardly curved portions 84a terminating at the opening 74 so that heat losses through the opening 74 are minimized when the opening is uncovered.

As pointed out previously, heating elements 18 are also provided in the top wall 6 on each side of the slot 76 (FIG. 3) to minimize heat losses through the slot 76.

Additional heating elements 18 may, if desired, be mounted in the lower surface of the partition 22 at the upper end of the chimney 42 to add heat to the air in chimney 42 before it passes through the openings 66.

The openings 74 on the inlet and outlet sides of the furnace A are each controlled by doors which may be of identical construction. The construction of one of the doors is illustrated in detail in FIGS. 7, 8 and 9. Reference numeral 84 collectively designates a door movable between open and closed positions with respect to the opening 74 and which is made up of a plurality of segments 88, each adjustably secured to an elongated support bar 86.

Each of the segments 88 is comprised of a block 90 of ceramic or other refractory material, which material may be the same as the material of layer 14, supported in jackets or sheaths 92 of metal such as steel. The jackets 92 each include outwardly projecting support bar flanges 94 and inwardly projecting block engaging flanges 96 (FIG. 9). The flanges 96 are received in slots formed in the respective blocks 90 to secure the blocks to the jackets 92. The flanges 94 are formed with elongated slots 98, and conventional bolts 100 are inserted through openings in the support bar 86 aligned with the slots 98 to secure the segments 88 individually to the support bar 86. The slots 98 permit the segments to be individually adjusted with respect to the support bar 86 to accommodate any irregularities in the surfaces of the projections 78 with which the door is engaged when it is in the closed position as shown in FIG. 9 so that each segment 88 may have as tight a fit as possible with the projections 78 to assure a minimum loss of heat when the doors are closed.

Two of the segments 88 are designated in FIG. 7 by reference numerals 88a and 88b. Door actuating arms 102 are secured to the support bar 86 at segments 88a and 88b. The actuating arms 102 are each welded to plates 104 which in turn are secured by conventional bolts 106 to the support bar 86. Slotted openings are provided either in the support bar 86 or plates 104 to permit adjustment of the segments 88a and b in the same manner as the remaining blocks 88. The actuating arm 102 is pivotally connected at spaced points to the ends of parallel links 108 and 110. Link 108 has its other end nonrotatably secured to a rod 114, and link 110 has its other end nonrotatably secured to a rod 112. Rods 112 and 114 are rotatably supported at their upper end to a bracket 116. Rod 112 is rotatably supported at its lower end in a bracket 102 and rod 114 is rotatably supported at its lower end in a bracket 118.

The door 84 is moved between its open and closed positions by a hydraulic ram 122 having its cylinder end pivotally connected at 123 to a bracket 125 and its piston end pivotally connected to an operating level 124 nonrotatably secured to rod 114. When the ram 122 is retracted from the position shown in FIGS. 7 and 9, the links 108 and 110 pivot about the axes of the respective rods 114 and 112 in a counter-clockwise direction to move the door 84 away from the opening 74.

In summary, FIGS. 3 through 9 illustrate a furnace having a substantially circular cross-section with a plurality of blower units 50, 52 disposed about the periphery of the furnace in a zone below and separated from the glass treating zone 26. Make-up air can be supplied through the rectangular chimney 24 and its openings 66 in addition to recirculating the air from the glass treating upper zone 26 past the heating elements 18 at the sides of the furnace. Furthermore, the layer or blocks 14 of material at the top or roof of the furnace is also integrally formed with T-sections 16 forming grooves into which the elongated heating elements 18 at the roof of the glass treating zone 26 can be slipped into and secured into place. When the blowers are operating, make-up air can be drawn into the furnace through openings 46a at the lower end of the chimney 42 at a rate depending upon the position of the adjustable damper 46. The ramps 64 associated with the blowers 50 (FIG. 6) serve to mix and recirculate the air upwardly and tangentially toward the return passages defined by the slots 32, while the vanes or blocks 30 deflect the recirculated air vertically and somewhat tangentially along the side walls of the furnace and the heating elements 18 located at the side walls. The openings 58 surrounding the blower shaft also prevent overheating of the blowers when the blowers are not operating because the chimney effect causes outside air to always be drawn through the openings 58 to cool the blowers.

Again referring to FIG. 3, reference numeral 126 designates a collection tray suspended from the top or roof 6 of the furnace by rods 128. The tray 126 collects any pieces of glass that are broken during the heat treating process and facilitates removal of the broken glass from the furnace and prevents the pieces from falling into places of difficult access in the furnace.

Figure 10A:
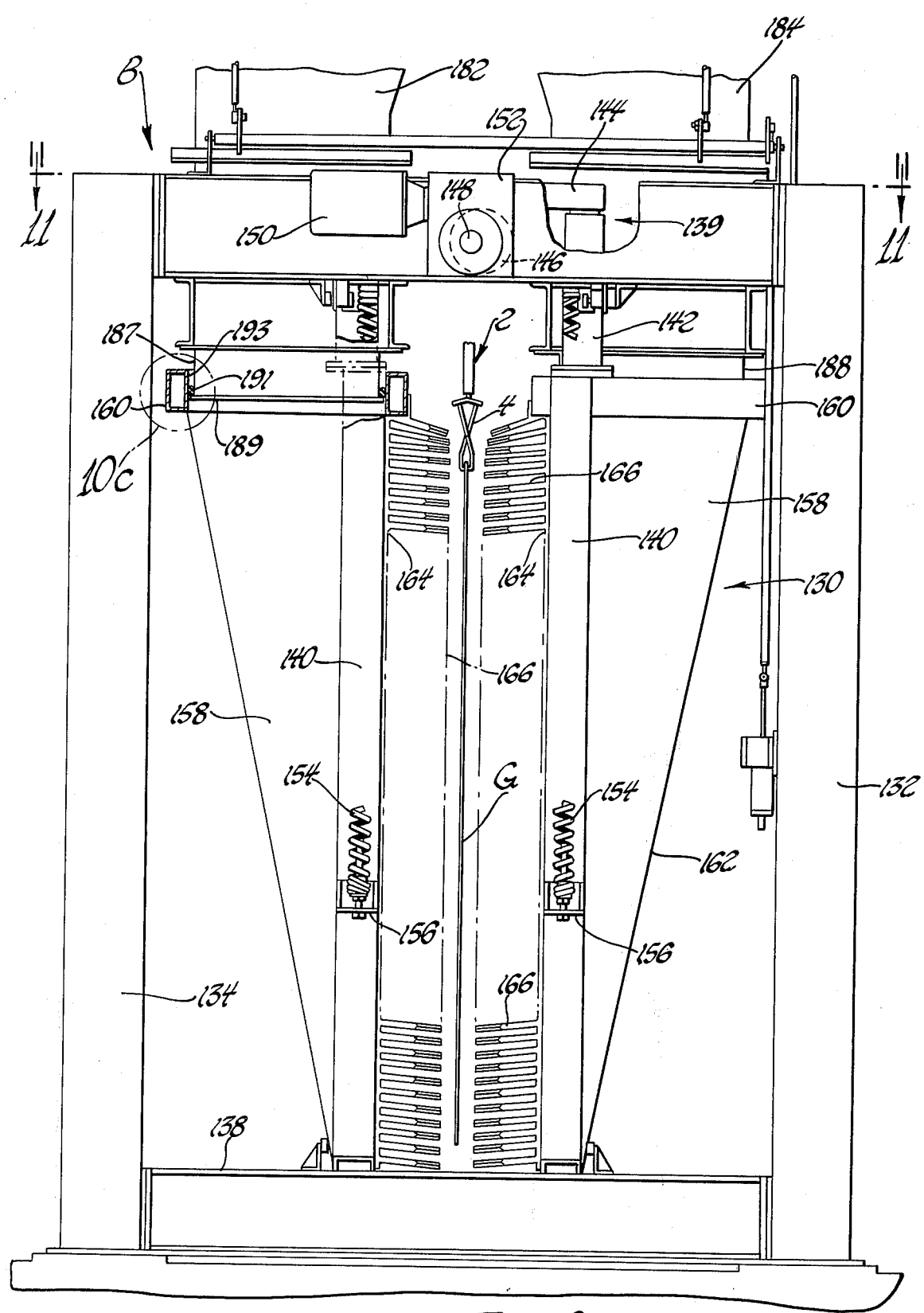
FIG. 10a is an elevational view of a tempering blasthead embodying the invention.
Figure 106:
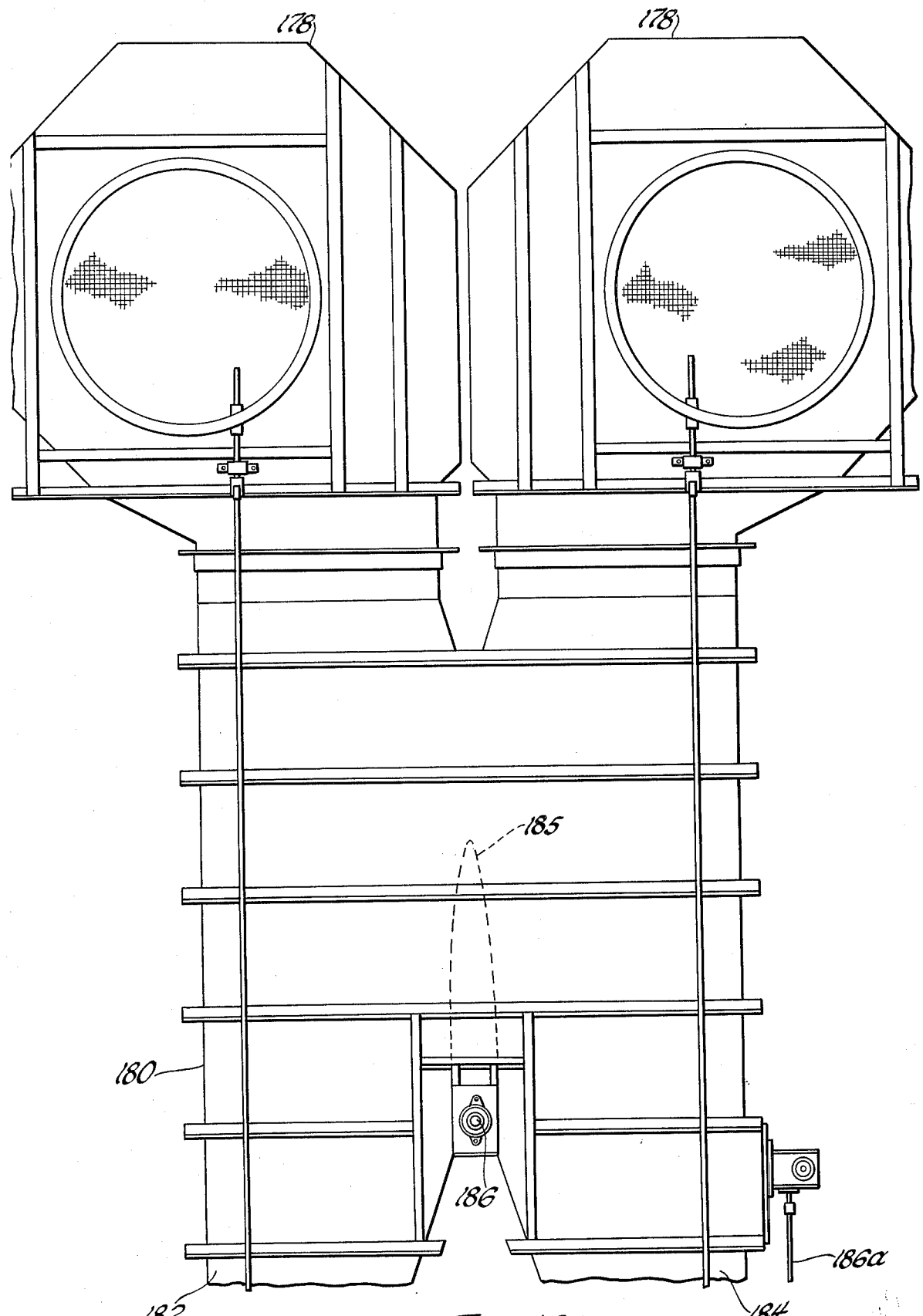
Figure 11:
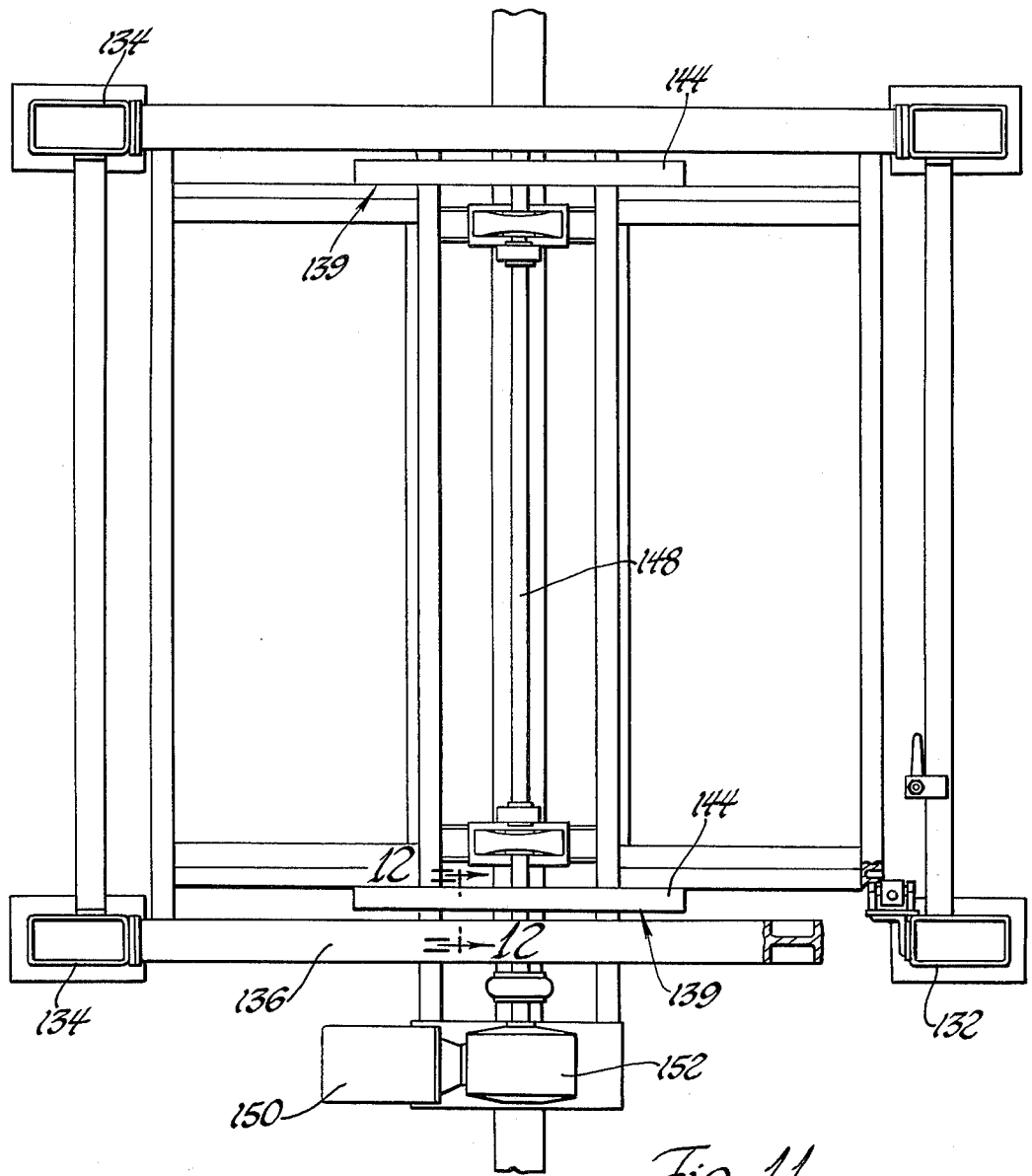

The blasthead B is illustrated in detail in FIGS. 10a through 12. With reference to FIG. 10a, the blasthead B includes a plenum chamber and nozzle assembly designated collectively by reference numeral 130 which is supported for reciprocating movement on a stationary frame. The stationary frame includes spaced upright post members 132 and 134 with an overhead beam 136 extending between the upper ends of the post. A base member 138 extends between the lower ends of the post.

The plenum chamber and nozzle assembly 130 includes U-shaped supporting frames or yokes 139 (FIG. 11) as shown in FIG. 10a, each yoke 139 includes a pair of spaced, vertical legs having lower segments 140 secured to upper segments 142, and an upper, horizontal base member 144. The base member 144 of each yoke is supported on an eccentric 146 nonrotatably secured to a shaft 148 driven by a motor 150 through a gear box 152. In addition to being supported on the eccentrics 146, the assembly 130 is suspended from the overhead beam 136 on springs 154 having their upper ends secured to the overhead beam 136 and their lower ends secured to support brackets 156 mounted on the leg members 140 of the yoke.

The assembly 130 further includes a pair of plenum chambers 158 having inclined outer side walls 162 extending downwardly and inwardly from a peripheral rectangular frame or collar member 160, and straight, parallel inner side faces 164. Projecting inwardly from the inner side faces 164 in opposed relationship with each other is a bank or series of nozzle members 166. Each series of nozzle members 166 extends from each inner side face 164 throughout its entire length. Each of the nozzles 166 is inclined downwardly from its respective inner side face 164 and does not extend perpendicularly from its face 164.

As the glass sheet G is moved by the carrier 2 into the space between the opposed banks of nozzles 166, air or other cooling fluid is impinged onto the sheet G. Rotation of the shaft 148 causes the assembly 130 to reciprocate in a vertical path with respect to the supporting frame due to the engagement of the eccentrics 146 with the upper horizontal base members 144 of the respective yokes 139. Consequently, the nozzles 166 reciprocate at the same time that they are directing jets of cooling fluid onto the sheet G so that the surfaces of the sheet G are uniformly bathed by the cooling fluid and do not create depressions or other distortions in the surface of the sheet G before it hardens. The downward inclination of the nozzles 166 drives the heat and spent air downwardly off the bottom of the sheet G to better maintain a pressure balance on the opposite surfaces of the sheet G to center the glass between the nozzles.

As shown in FIG. 10a, the nozzles 166 at the upper ends of each bank of nozzles have a greater downward inclination than the other nozzles. The air from the upper nozzles does not impinge on the carrier 2 which thus reduces the likelihood of heat distortion of the carrier 2 while it is located in the blasthead.

The entire weight of the assembly 130 including the plenum chambers 158 and the yoke consisting of the members 140, 142 and 144 is not supported on the pair of eccentrics 146. A substantial portion of the weight is carried by the springs 154 to provide a smooth reciprocating motion during rotation of the shaft 148 and eccentric 146.

Figure 12:
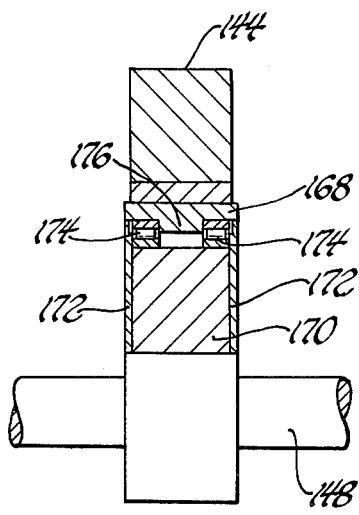
FIG. 12 is a sectional view taken along lines 12—12 of FIG. 11.

The construction of the eccentrics 146 is illustrated in detail in FIG. 12. Each eccentric 146 includes an assembly including a circular disc 170 fixed to the shaft 148 about an axis eccentric to the circular disc. The disc 170 is rotatably received in a concentric ring member 168 having an inwardly projecting rib 176. Roller bearing assemblies 174 are received between the periphery of the disc 170 and the inner periphery of the ring 168 on opposite sides of the rib 176. The bearing assemblies 174 are held captive by end plates 172, the peripheries of which project beyond the periphery of the disc 170. As the disc 170 rotates with the shaft 148, the horizontal base member 144 of the yoke reciprocates relative to the shaft 148 because of the eccentric relationship between the disc 170 and the shaft 148.

Air is supplied to the plenum chambers 158 by a pair of blowers 178 (FIG. 10b) which, in the illustrated embodiment, are mounted above the blasthead B. The blowers 178 feed into a common duct 180 which then divides into separate ducts 182 and 184. A damper 185 having a shaft 186 with conventional adjustable control means 186a interconnected with shaft 186 provided to maintain equal pressures in the ducts 182 and 184, and hence in the two plenum chambers 158.

Figure 10C:
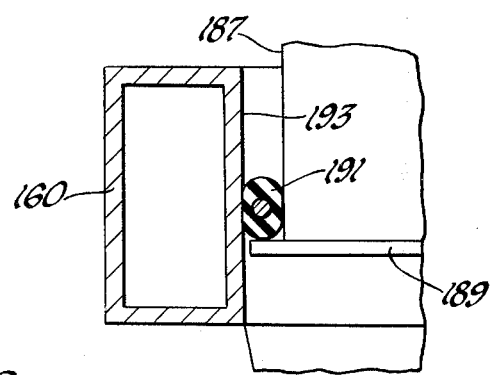

Again referring to FIG. 10a, each of the ducts 182 and 184 has an outlet end 187 which is received in the collar 160 defining the upper end of the plenum chamber 158. The outlet end 187 of the duct has an outwardly projecting flange 189, and rolling seal members 191 are received in the space between the outer surfaces of the outlet duct 187 and the inner surface of the plenum chamber. The seal members 191 are in the form of straight rods of metal, such as steel, encased in rubber or other elastomeric material. The seals roll relative to the reciprocating surfaces 187 and 193 without permitting the leakage of pressure. Furthermore, the seal 191 may be a completely dry seal. No oil is required for lubrication which would possibly contaminate the air supply impinged onto the glass sheet G, and to which broken glass particles would stick and damage the seal. FIG. 10c shows an enlarged view of this construction.

The drive conveyor for moving the carrier 2 from the loading station through the treatment zone (furnace A and blasthead B) includes a pair of spaced parallel rails 188 extending from the loading station C to the unloading station D. The rails 188 are each seated on a strip 188a, the strips 188a being spaced from each other but having their opposed inner edges projecting over the slot 76 so that a smaller slot is defined between the strips 188a. FIGS. 13a and 13d illustrate the ends of the drive conveyor at the loading and unloading stations, respectively. FIGS. 13b and 13c illustrate portions of the drive conveyor in the area of the furnace A. FIG. 16 illustrates the portion of the conveyor located on the roof or top 6 of the furnace. The drive conveyor further includes a pair of endless, flexible members 190 each having an active run slidably supported on one of the rails. As shown in FIGS. 13a through 16, the endless, flexible members 190 are in the form of a chain having links 192 and rollers 194. The diameter of each of the rollers is greater than the width of the links so that the rollers support the active runs of the chains 190 on the respective rails 188, and the upper peripheries of the rollers project beyond the upper edges of the links.

Each of the carriers 2 comprises a pair of slide members 196 which, as shown in FIG. 16, is supported on the rollers 194 of the chains 190 and extends across the space between the rails 188. As shown in FIG. 13d, each of the carriers 2 has a pair of longitudinally spaced slide members 196. Depending from each slide member is a suspension member 198 which extends through the slot between the rails. A material supporting bar 200 is supported on the suspension members 198, and the tongs 4 are mounted on the material supporting bar 200. As shown in FIG. 16, the suspension members 198 also extend through the slot 76 in the top wall 6 of the furnace, and the material supporting bar 200 is received in the furnace.

With the slide members 196 supported on the peripheries of the rollers 194, and the rollers 194 also supported on the rails 188, advancement toward the right as viewed in FIGS. 13a–13d, causes the rollers 194 to rotate about their respective axles 195, which axles also form the pivotal connection between the ends of the links 192. In other words, the links 192 are pivotally connected in end to end relationship by the axles 195 of the adjacent rollers. The rotation of the rollers 194 causes the slide members 196 to move toward the right due to the frictional engagement between the slide members and the rollers 194 on which the slide members are supported, and only the links 192 are supported on the axles. Furthermore, with no slippage between the rollers and slide members, the slide members 196 move twice as far as the links 192.

One end of each chain 190 is supported on an idler sprocket 202 (FIG. 13a) at the loading station end of the drive conveyor, and the other end is supported on a drive sprocket 204 located at the unloading station end of the drive conveyor. The rails 188 extend longitudinally between the sprockets 202 and 204, and hence, the active run of the drive chain 190 comprises a straight length of chain extending between the sprockets 202 and 204 and supported on the respective rails 188.

The inactive run of each chain extends from the sprocket 202 through a channel-shaped return rail 206 (FIG. 13a) to a sprocket 208 (FIG. 13b), and from the sprocket 208 upwardly to a sprocket 210. The inactive run of the chain 190 extends from the sprocket 210 beneath guide members 212 and 214 (FIGS. 13b and 13c, respectively) to sprockets 216 and 218, and from sprocket 218 through a second channel-shaped return rail 206 to the drive sprocket 204.

Power means is provided to intermittently advance the drive conveyor so that the carrier 2 dwells in each of the loading station, furnace, blasthead and unloading station for preselected periods of time.

The power means for driving the drive conveyor is illustrated in FIGS. 13d and 14 by reference numeral 220 and includes a conventional motor 222 which is intermittently energized by a conventional timing mechanism including a timing motor 224 and a cam 226. The motor 222 is intermittently energized to cause the chain 190 to advance a preselected distance at preselected time intervals. Thus, the carrier 2 can have dwell periods at the loading station, in the furnace A, in the blasthead B, and at the unloading station D.

Pinion gears 223 are fixed to the opposite ends of the output shaft 221 and are each drivingly engaged with one of a pair of conveyor drive gears 225. The drive sprockets 204 are each fixed to the shaft of the drive gears 225 (FIG. 13d). The cam 226 is constantly driven by the timing motor 224 and is operable to intermittently actuate control devices 227, such as conventional microswitches or the like, to in turn alternately energize and deenergize the motor 222 to provide the dwell periods.

The active runs of the drive conveyor chains on which the slide members 196 are supported extend through an enclosure 228. As shown in FIG. 16, the enclosure 228 includes inner and outer side walls 232 and 234, and a top wall 236 extending between the side walls 234. The enclosure 228 closes the slot 76 in the top wall of the furnace to act as a seal to prevent hot gases from escaping from the furnace. The portion of the top wall 236 of the enclosure 228 that extends across the top of slot 76 is formed with a plurality of openings 230 for the admission of air or other cooling fluid to reduce the temperature to a level commensurate with maintaining proper lubrication of the axles of the rollers 194. The admission of air under pressure through the openings 230 pressurizes the enclosure 228 to further prevent the escape of hot gases from the furnace through the slot 76.

As shown in FIGS. 4 and 16, a housing 237 is mounted on the portion of the enclosure 228 that extends across the top of the furnace and overlies slot 76. The housing 237 has ends 237a (FIG. 4) and defines a cooling chamber 237b connected with a blower 239 for supplying the chamber 237b with cooling air and pressurizing the chamber 237b. The cooling air from chamber 237b is admitted into the enclosure 228 through the openings 230. A pair of slots or series of openings 241 are formed in the top wall 236 of the enclosure. The slots or openings 241 extend substantially the entire width of the top wall 236 and are inclined downwardly and inwardly at locations overlying the upper ends of the doors 84 when the doors 84 are in their closed positions. The slots or series openings 241 are smaller than the openings 230 so that the velocity of air flowing through slots 241 from chamber 237b into the enclosure 228 is greater than the velocity of the air flowing through openings 230. Consequently, a continuous air curtain 243 is formed by the air flowing through slots 241, which air curtain extends throughout the width of the enclosure 228. The air curtains 243 help to confine the air in the enclosure 228 between the slots 241 and maintain a pressure over the slot 76 from the blower 239 that reduces the flow of hot gases upwardly through slot 76 from the furnace. The slots are also inclined downwardly and inwardly so that the air curtains 243 impinge on the upper ends of the doors 84 in their closed positions to thus reduce the leakage through any gaps between the tops of the doors and the furnace.

In order to maintain adequate frictional engagement between the rollers 194 and the slide members 196, the system includes means for applying friction material to the peripheries of the rollers to reduce slippage between the rollers and the slide members. The means for applying friction material includes the channel-shaped return rails 206 with powdered friction material received therein as illustrated in FIG. 16a. The inactive run of the chain on its return movement to the loading station end of the drive chain passes through the channels 206 and the powdered friction material contacts and adheres to the peripheries of the rollers. The powdered friction material is indicated by reference numeral 240 in FIG. 16 and may be plaster of paris or similar material. The powder 240 also serves to remove lubricant from the peripheries of the rollers 194 to reduce the slippage between the rollers and the slide members 196.

The return conveyor for returning the carrier 2 from the unloading station to the loading station includes an elongated housing 242 having side walls 244 (FIG. 15) and bottom wall members 246 each having upturned flanges 248 with a space defined between the flanges 248 for receiving the suspension member 198 of the carrier 2. The flanges 248 and side walls 244 support idler rollers 250. A drive chain 252 extends around guide rollers 254 (FIGS. 1 and 14) to a powered drive sprocket 256. The drive chain 252, as shown in FIG. 15, extends along the inner surface of the right-hand side wall 244 and is provided with laterally extending lugs 256 at spaced intervals along the length of the chain 252. As shown in FIGS. 14 and 15, if a slide member 196 is located at the unloading station, the continuously driven return conveyor chain 252 will bring a lug 256 into engagement with the slide member 196 and drive the carrier over the rollers 250 around the track defined by the housing 242 to the loading station. As shown in FIG. 1, the chain 252 (moving in the direction of arrow 260 in FIG. 1) permits the lug 256 to move out of engagement with the slide member 196 of the carrier 2 as the leading slide member of the carrier moves onto the drive conveyor chain 190 (PFIG. 13a).

In operation of the entire system, a plurality of the carriers 2 are mounted on the conveying means E and F. When the system is started into operation, the return conveyor chain 252 runs in phased relationship with the drive conveyor chain 190 which advances a selected distance at time intervals determined by the intermittent operation of the power means 220 by the timing mechanism 224.

When a carrier 2 is pushed onto the loading station end of the drive conveyor E by the return conveyor chain 252, an operator can secure glass sheets to be treated to the tongs 4 on the material supporting bar 200. The glass sheet G can be secured to the carrier 2 during the dwell period of the drive conveyor, however, should additional time be needed to complete securing of the sheet to the carrier, the operator can prevent the carrier from advancing with the drive chain 190 by simply holding the carrier against movement and letting the chain override the slide members 196 of the carrier. When a sheet is loaded onto the carrier, and the dwell period ends, the doors 84 of the furnace open and the carrier is conveyed onto the furnace through the opening 74 on the inlet side of the furnace by the drive chain 190. The carrier is conveyed into the furnace into the position shown in FIG. 4 where it stops for another dwell period. When the carrier reaches the position shown in FIG. 4, the doors 84 close and the glass sheet G is heated to its tempering temperature. At the end of the dwell period, the doors 84 open, and the carrier 2 within the furnace is conveyed through the opening 74 on the outlet side of the furnace A into the space between the blasthead nozzles 166 for the cooling operation as illustrated in FIG. 10a. The carrier 2 in FIG. 10a remains in the blasthead in the position shown in FIG. 10a for the next dwell period. The glass sheet G and carrier 2 is then conveyed by the drive conveyor from the blasthead B to the unloading station D for removal of the glass sheet G from the carrier by an operator. The carrier is then in a position to be engaged by a lug 256 of the return conveyor chain 252 and is conveyed back to the loading station C.

FIGS. 17a, b, c, d and 18 illustrate an alternative construction for the drive conveyor and conveyor cooling system. FIG. 17a, like FIG. 13a of the previously described embodiment, is an elevational view of the drive conveyor at the loading station. FIGS. 17b and c, like FIGS. 13b and c, are elevational views including the portions of the drive conveyor that extends across the furnace (the furnace being omitted from FIGS. 17b and c), while FIG. 17d is an elevational view of the portion of the drive conveyor located at the unloading station as is the case with FIG. 13d of the previously described embodiment.

The drive conveyor of the embodiment of FIGS. 17a, b, c, d and 18 includes a pair of chains 390 identical to the chains 190 of the previously described embodiment. A pair of spaced parallel rails 388 (FIG. 18) each support the upper, active run of the chains 390. The chains 390 each include links 392 and rollers 394. The links 392 are connected in end to end pivotal relationship by pins 395 forming the axles for the rollers 394. One end of each chain 390 is supported on a drive sprocket 396 (FIG. 17a) at the loading station end of the drive conveyor, and the other end is supported on an idler sprocket 397 (FIG. 17d) located at the unloading station end of the drive conveyor. The idler sprocket 397 is rotatably mounted on an arm 398 in turn being pivotally mounted to a support bracket by a pin 399. The arm 398 is biased in a counterclockwise direction as viewed in FIG. 17d about the axis of pin 399 and a spring and plunger arrangement 400 mounted between a bracket 401 and a projection 402 secured to the arm 398. The spring and plunger assembly 400 maintains a constant tension on the chain 390. The drive sprocket 396 is driven by a power means indicated collectively by reference numeral 403 in FIG. 17a which may be of identical construction to the power means and drive assembly of the embodiment of FIGS. 13a–d.

Figure 17D:
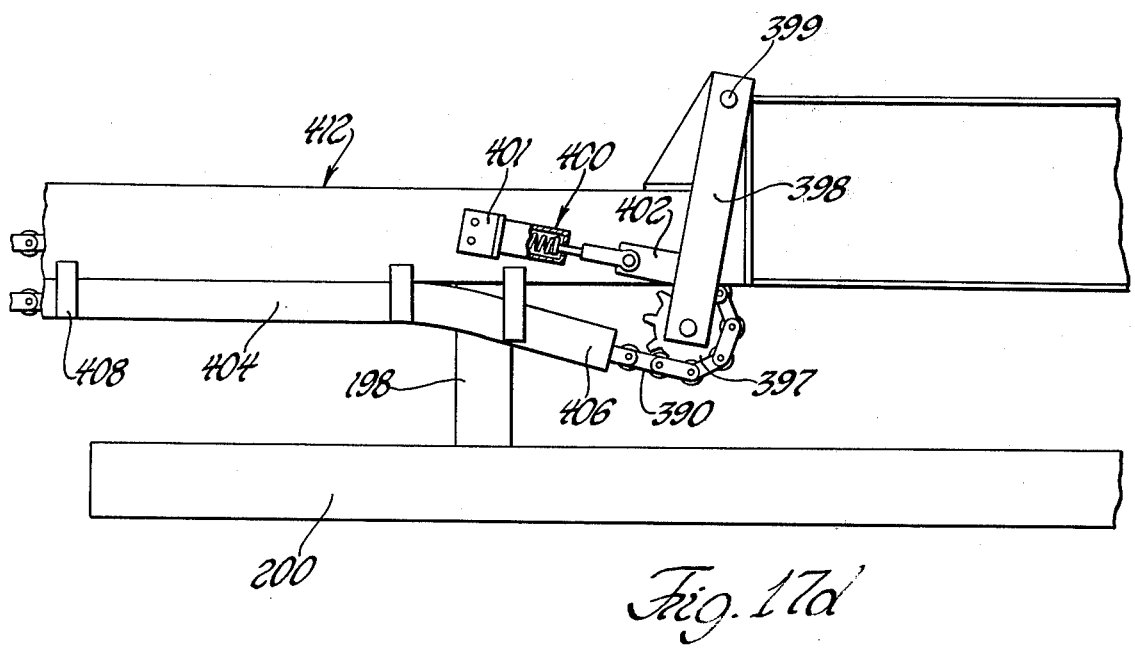

The lower, inactive runs of the chains 390 extend through tubular return guide members 404 having downwardly inclined ends 406 adjacent the drive and idler sprockets 396 and 397 (FIGS. 17a and 17d). As shown in FIG. 18, the tubular return guide members 404 are seated on the strips 188a and completely enclose the return or inactive runs of the chains 390. The guide members 404 are of square or rectangular cross-section as shown in FIG. 18 and are secured by connectors 408 to the outer side walls 410 of an enclosure 412 for the upper, active runs of the chains 390. The enclosure 412 extends from the loading station through the treatment zone to the unloading station.

The enclosure 412 includes a top wall 414 extending between the outer side walls 410 and a pair of spaced, inner side walls 416, the rails 388 each being located between adjacent pairs of the outer and inner side walls 410 and 416, respectively.

The portion of the enclosure 412 that extends across the treatment zone is received in a housing or shroud 418. The shroud 418 has a top wall 420, side walls 422 extending downwardly from the top wall, and bottom walls 424 extending inwardly from the lower ends of the side wall 422 and seated on the strips 180a. The bottom walls 424 have upturned, inner flanges 426 engaging the sides of the tubular guides 404, the upper ends of the guide members terminating beneath spacers 428 at each of the connectors 408. The shroud or housing 418 has end walls 430 which are located approximately in the same position with respect to the furnace doors 84 as the end walls 237a of the housing 237 of FIG. 4.

The housing 418 is connected through conduit 432 with a blower 434. The housing 418 defines a pressure chamber 436 for supplying cooling air (or other fluid) to the portions of the chains 390 passing over the slot 76. The pressure in chamber 436 also acts against the pressure in the furnace to reduce the loss of heat through slot 76. The pressure in chamber 436 tends to balance the pressure in the upper heating zone 26 of the furnace so that there is a minimum amount of transfer of fluid through slot 76 in either direction.

Formed in the outer side walls of the tubular guide members 404 is a series of openings 438. The series of openings 438 extends throughout the length of the tubular guide members 404 that is enclosed by the housing 418. Similarly, a series of openings 440 are formed in the top wall of the guide members 404 along the lengths of the guide members enclosed by the housing 418. A series of openings 441 are also formed along the lengths of the rails 338, and each of the openings 440 is aligned with one of the openings 441. Consequently, air from the chamber 436 flows through the openings 438, 440 and 441 to the enclosure 412. The cooling air from the blower 434 is under pressure, and flows into the space between the inner side walls 416 of the enclosure 412 as is indicated by the arrow 444 in FIG. 18, and the pressure acts downwardly as indicated by the arrows 446 toward the slot 76. As a result, a pressure boundary is provided between the cooling air from the blower 434 and the hot gases from the heating zone 26 of the furnace at the slot 76. The chains 390 are thus not subjected to the high temperature from the furnace, and consequently, adequate lubrication can be maintained between the rollers 394 and their respective axles 395 since the blower 434 is able to maintain a sufficiently low temperature on the chains to prevent loss of lubrication. As in the previously described embodiment, friction material such as plaster of paris may be provided in the tubular guide members 404 to remove any lubricant from the peripheries of the rollers 394 and also to reduce the slippage between the rollers 394 and slide member 196 as the carriers move through the furnace.

While specific forms of the invention have been illustrated and described in the foregoing specification and accompanying drawings, it will be apparent to those skilled in the art that the invention is not limited to the exact construction shown, and that alterations and modifications in the construction and arrangement of parts, all falling within the scope and spirit of the invention, can be made by those skilled in the art.

The embodiment of the invention in which an exclusive property or privilege is claimed are defined as follows:

1. A system for treating glass sheet material and the like comprising: means defining a treatment zone; means defining a loading station at one end of said treatment zone; means defining an unloading station at the other end of said treatment zone; said treatment zone including a furnace with a top wall having a slot formed therein; a carrier for supporting material to be treated; conveying means including a drive conveyor for frictionally driving said carrier from said loading station through said treatment zone to said unloading station; said drive conveyor comprising a pair of spaced, parallel rails extending from said loading station to said unloading station through said treatment zone, said rails extending across the top wall of said furnace parallel to said slot, one rail being located on each side of said slot, and a pair of endless flexible chains one of said chains having one run supported on one of said rails, and the other of said chains having one run supported on the other of said rails, said chains each including a series of rollers connected by links, said links being pivotally connected together in end to end relationship by pins defining the axles of said rollers; said carrier comprising at least one slide member bridging the space between said rails, said slide member being frictionally supported on the periphery of said rollers when said carrier is located on said drive conveyor, and said rollers on said one run of said chain also having their peripheries supported on said rail such that advancement of said one run of said chain causes rotation of the rollers to frictionally advance said slide member.

2. A system as claimed in claim 1 including power means operable to intermittently drive said chain such that said chain, and hence said carrier, dwells in each of said loading station, treatment zone, and unloading station for preselected periods of time.

3. A system as claimed in claim 2 wherein said conveying means further includes a return conveyor for returning said carrier to said loading station from said unloading station and bypassing said treatment zone.

4. A system as claimed in claim 3 wherein said return conveyor includes means for positively engaging said carrier at said unloading station and removing said carrier from said drive conveyor and carrying said carrier to said loading station and replacing said carrier on said drive conveyor.

5. A system as claimed in claim 1 further including means for cooling at least one run of said chain as it moves said carrier through at least a portion of said treatment zone to prevent the temperature of lubricant between said rollers and their respective axles from becoming excessive.

6. A system as claimed in claim 5 wherein said means for cooling comprises an enclosure for said rail and chain with means for introducing cooling fluid into said enclosure to reduce the temperature therein.

7. A system as claimed in claim 1 further including means for applying friction material to the peripheries of said rollers to reduce slippage between said rollers and the slide member of said carrier.

8. A system as claimed in claim 1 wherein said conveying means further includes a return conveyor for returning said carrier to said loading station from said unloading station and bypassing said furnace.

9. A system as claimed in claim 8 wherein said return conveyor includes means for positively engaging said carrier at said unloading station and carrying said carrier to said loading station and replacing said carrier on the drive conveyor.

10. A system as claimed in claim 1 wherein said treatment zone further includes a blast head located between the outlet of said furnace and said unloading zone, said blast head being operable to cool material as it is moved by said carrier from said furnace to said blast head.

11. A system as claimed in claim 10 including power means for said drive conveyor operable to intermittently actuate said drive conveyor such that said carrier sequentially dwells at each of said loading station, furnace, blast head, and unloading station for preselected time intervals.

12. A system for treating glass sheet material and the like comprising: means defining a treatment zone; means defining a loading station at one end of said treatment zone; means defining an unloading station at the other end of said treatment zone; said treatment zone including a furnace with a top wall having a slot formed therein; a carrier for supporting material to be treated; conveying means including a drive conveyor for frictionally driving said carrier from said loading station through said treatment zone to said unloading station; said drive conveyor comprising a pair of spaced, parallel rails extending from said loading station to said unloading station through said treatment zone, said rails extending across the top wall of said furnace parallel to said slot, one rail being located on each side of said slot, and a pair of endless flexible chains one of said chains having one run supported on one of said rails, and the other of said chains having one run supported on the other of said rails, said chains each including a series of rollers connected by links, said links being pivotally connected together in end to end relationship by pins defining the axles of said rollers; said carrier comprising at least one slide member bridging the space between said rails, said slide member being frictionally supported on the periphery of said rollers when said carrier is located on said drive conveyor, and said rollers on said one run of said chain also having their peripheries supported on said rail such that advancement of said one run of said chain causes rotation of the rollers to frictionally advance said slide member; means for applying friction material to the peripheries of said rollers to reduce slippage between said rollers and the slide member of said carrier; said means for applying friction material comprising a channel-shaped return rail receiving the other run of said chain, and powdered friction material received in said return rail for adhering to and removing lubricant from the peripheries of said rollers to increase the friction between said rollers and the slide member of said carrier.

13. A system as claimed in claim 12 wherein said powdered friction material comprises plaster of paris.

14. A system for treating glass sheet material and the like comprising: means defining a treatment zone; means defining a loading station at one end of said treatment zone; means defining an unloading station at the other end of said treatment zone; said treatment zone including a furnace with a top wall having a slot formed therein; a carrier for supporting material to be treated; conveying means including a drive conveyor for frictionally driving said carrier from said loading station through said treatment zone to said unloading station; said drive conveyor comprising a pair of spaced, parallel rails extending from said loading station to said unloading station through said treatment zone, said rails extending across the top wall of said furnace parallel to said slot, one rail being located on each side of said slot, and a pair of endless flexible chains one of said chains having one run supported on one of said rails, and the other of said chains having one run supported on the other of said rails, said chains each including a series of rollers connected by links, said links being pivotally connected together in end to end relationship by pins defining the axles of said rollers; said carrier comprising at least one slide member bridging the space between said rails, said slide member being frictionally supported on the periphery of said rollers when said carrier is located on said drive conveyor, and said rollers on said one run of said chain also having their peripheries supported on said rail such that advancement of said one run of said chain causes rotation of the rollers to frictionally advance said slide member; said treatment zone including a furnace having an inlet and an outlet; said loading station being located on the inlet side of said furnace, and said unloading station being located on the outlet side of said furnace; a drive conveyor comprising a pair of spaced parallel rails extending from said loading station to said unloading station across said furnace; and a pair of endless, flexible chains, said one chain having an active run supported on said one rail, and the other of said chains having an active run supported on the other of said rails; said slide member bridging the space between said rails and frictionally supported on the peripheries of the rollers of said active runs of both chains when said carrier is located on said drive conveyor; said furnace having a top wall with a slot formed therein and extending between the inlet and outlet of said furnace; said rails extending across the top wall of said furnace parallel to said slot, one rail being located on each side of said slot, and enclosure means connecting said rails and sealing said slot.

15. A system as claimed in claim 14 wherein said carrier comprises a suspension member depending from said slide member and a material supporting bar carried by said suspension member.

16. A system as claimed in claim 15 wherein said suspension member extends through the slot in the top of said furnace and said material supporting bar is received in said furnace as said carrier is moved from the inlet to the outlet of said furnace by said drive conveyor.

17. A system as claimed in claim 16 including means for cooling the active runs of said chains located on the top of said furnace.

18. A system as claimed in claim 17 wherein said means for cooling comprises an enclosure for said rails and chains on said furnace top with means for introducing cooling fluid into said enclosure to reduce the temperature therein.

19. A system as claimed in claim 18 further including means for applying friction material to the peripheries of said rollers to reduce slippage between said rollers and slide members.

20. A system as claimed in claim 19 wherein said means for applying friction material comprises a pair of channel-shaped return rails each receiving the inactive run of one of said chains, and powdered friction material received in said rails for contact with the peripheries of said rollers to increase the friction between the rollers and the slide member of said carrier.

21. A system as claimed in claim 20 wherein said conveying means further includes a return conveyor for returning said carrier to said loading station from said unloading station and bypassing said furnace.

22. A system as claimed in claim 21 wherein said return conveyor includes means for positively engaging said carrier at said unloading station and carrying said carrier to said loading station and replacing said carrier on the drive conveyor.

23. A system as claimed in claim 16 including an inlet door for said furnace having a closed position closing said inlet of said furnace and an open position permitting said carrier to move into said furnace from said loading zone.

24. A system as claimed in claim 23 including an outlet door for said furnace having a closed position closing said outlet and an open position permitting said carrier to move from said furnace through said outlet.

25. A system as claimed in claim 24 further including power means for moving said inlet and outlet doors between their respective open and closed positions.

26. A system as claimed in claim 25 wherein said power means includes an inlet power element for operating said inlet door between its open and closed positions, and an outlet power element for operating said outlet door between its open and closed positions.

27. A system as claimed in claim 26 including power means for said drive conveyor operable to intermittently drive said drive conveyor such that said carrier dwells at each of said loading station, furnace, and unloading station for preselected time intervals.

28. A system as claimed in claim 27 including control means for sequentially activating said drive conveyor to move said carrier from said loading station to said furnace and actuating said inlet power element to open said inlet door, said control means actuating said power element to close said inlet door after a preselected time interval.

29. A system as claimed in claim 27 wherein said control means is sequentially operable to actuate said drive conveyor to move said carrier from said furnace and actuate said outlet power element to open said outlet door, said control means actuating said outlet power element to close said outlet door after a preselected time interval.

30. A system as claimed in claim 29 wherein said treatment zone further includes a blast head located between the outlet of said furnace and said unloading zone, said blast head being operable to cool material as it is moved by said carrier from said furnace to said blast head.

31. A system as claimed in claim 30 wherein said power means for said drive conveyor is operable to cause said carrier to dwell at said blast head for a preselected time interval.

32. A system as claimed in claim 17 wherein said treatment zone further includes a blast head located between the outlet of said furnace and said unloading zone, said blast head being operable to cool material as it is moved by said carrier from said furnace to said blast head.

33. A system as claimed in claim 32 further including means for applying friction material to the peripheries of said rollers to reduce slippage between said rollers and slide members.

34. A system as claimed in claim 33 including means for cooling the active runs of the chains of said drive conveyor located on the top of said furnace.

35. A system as claimed in claim 34 wherein said means for cooling comprises an enclosure for said rails and chains on said furnace top with means for introducing cooling fluid into said enclosure to reduce the temperature therein.

36. A system as claimed in claim 33 further including means for applying friction material to the peripheries of said rollers to reduce slippage between said rollers and slide members.

37. A system for treating glass sheet material and the like comprising: means defining a treatment zone; means defining a loading station at one end of said treatment zone; means defining an unloading station at the other end of said treatment zone; said treatment zone including a furnace with a top wall having a slot formed therein; a carrier for supporting material to be treated; conveying means including a drive conveyor for frictionally driving said carrier from said loading station through said treatment zone to said unloading station; said drive conveyor comprising a pair of spaced, parallel rails extending from said loading station to said unloading station through said treatment zone, said rails extending across the top wall of said furnace parallel to said slot, one rail being located on each side of said slot, and a pair of endless flexible chains each having one run supported on a respective one of said rails; said carrier comprising at least one slide member bridging the space between said rails and frictionally supported on said one runs of said chains when said carrier is located on said drive conveyor such that advancement of said one runs of said chains frictionally advances said slide member.

38. A system as claimed in claim 37 wherein said chain includes a series of rollers connected by links, said links being pivotally connected together in end-to-end relationship, said rollers on said one run of said chain having their peripheries supported on said rail, said one run of said chain having an upper periphery defined by one of said plurality of links or said plurality of rollers, said slide member being frictionally supported on said upper periphery of said one run of said chain when said carrier is located on said drive conveyor.

39. A system as claimed in claim 38 wherein said upper periphery of said one run of said conveyor is defined by the peripheries of said rollers such that advancement of said one run of said chain causes rotation of said rollers to frictionally advance the slide member supported on the peripheries of said rollers.

* * * * *